(12) United States Patent
Jain

(10) Patent No.: US 12,534,764 B2
(45) Date of Patent: *Jan. 27, 2026

(54) CRENOLANIB FOR TREATING FLT3 MUTATED PROLIFERATIVE DISORDERS ASSOCIATED MUTATIONS

(71) Applicant: Arog Pharmaceuticals, Inc., Plano, TX (US)

(72) Inventor: Vinay K. Jain, Dallas, TX (US)

(73) Assignee: Arog Pharmaceuticals, Inc., Plano, TX (US)

( * ) Notice: Subject to any disclaimer, the term of this patent is extended or adjusted under 35 U.S.C. 154(b) by 429 days.

This patent is subject to a terminal disclaimer.

(21) Appl. No.: 17/234,250

(22) Filed: Apr. 19, 2021

(65) Prior Publication Data
US 2021/0251980 A1 Aug. 19, 2021

Related U.S. Application Data

(63) Continuation-in-part of application No. 15/799,684, filed on Oct. 31, 2017, now Pat. No. 11,078,541.

(60) Provisional application No. 62/416,475, filed on Nov. 2, 2016.

(51) Int. Cl.
C12Q 1/6886 (2018.01)

(52) U.S. Cl.
CPC ..... *C12Q 1/6886* (2013.01); *C12Q 2600/106* (2013.01); *C12Q 2600/118* (2013.01); *C12Q 2600/156* (2013.01)

(58) Field of Classification Search
None
See application file for complete search history.

(56) References Cited

U.S. PATENT DOCUMENTS

| | | | |
|---|---|---|---|
| 5,990,146 A | 11/1999 | Boschelli et al. | |
| 7,071,337 B2 | 7/2006 | Kath et al. | |
| 7,183,414 B2 | 2/2007 | Tom et al. | |
| 9,023,880 B2 | 5/2015 | Jain | |
| 9,101,624 B2 | 8/2015 | Jain | |
| 9,393,240 B2 | 7/2016 | Jain | |
| 9,480,683 B2 | 11/2016 | Jain | |
| 9,801,870 B2 | 10/2017 | Jain | |
| 11,078,541 B2 * | 8/2021 | Jain ...................... | C12Q 1/6886 |
| 2004/0049032 A1 | 3/2004 | Charrier et al. | |
| 2005/0124599 A1 | 6/2005 | Kath et al. | |
| 2015/0031641 A1 | 1/2015 | Levine et al. | |
| 2018/0117031 A1 | 5/2018 | Jain | |

FOREIGN PATENT DOCUMENTS

| | | |
|---|---|---|
| WO | 1999016755 A1 | 4/1999 |
| WO | 2001040217 A1 | 6/2001 |
| WO | 2002032861 A2 | 4/2002 |
| WO | 2002092599 | 4/2002 |
| WO | 2003024931 | 3/2003 |
| WO | 2003024969 | 3/2003 |
| WO | 2003035009 | 5/2003 |
| WO | 2003037347 | 5/2003 |
| WO | 2003057690 | 7/2003 |
| WO | 2003099771 | 12/2003 |
| WO | 2004005281 A1 | 1/2004 |
| WO | 2004016597 A2 | 2/2004 |
| WO | 2004018419 A2 | 3/2004 |
| WO | 2004039782 A1 | 5/2004 |
| WO | 2004043389 A2 | 5/2004 |
| WO | 2004046120 A2 | 6/2004 |
| WO | 2004058749 A1 | 7/2004 |
| WO | 2018085292 A1 | 5/2018 |

OTHER PUBLICATIONS

Yang et al. Signal Transduction and Targeted Therapy. 2023. 8:425, p. 1-29 (Year: 2023).*

(Continued)

*Primary Examiner* — Carla J Myers
(74) *Attorney, Agent, or Firm* — Edwin S. Flores; Daniel J. Chalker; Chalker Flores, LLP

(57) ABSTRACT

The present invention includes methods for treating a FLT3 mutated proliferative disorder comprising: measuring expression of a mutated FLT3 and a one or more driver mutations in a nuclear transport protein that results in a loss of localization of the nuclear transport protein in a sample obtained from a tumor sample obtained from the patient, wherein the presence of the one or more genetic abnormalities indicates that the patient has a poor prognosis; and administering to the patient a therapeutically effective amount of Crenolanib or a pharmaceutically acceptable salt thereof, wherein the Crenolanib increases a chance of survival of the patient having both the mutated FLT3 and mutation in NPM1 or NUP98, wherein the Crenolanib, as shown below, is administered to a subject suffering from said disorder:

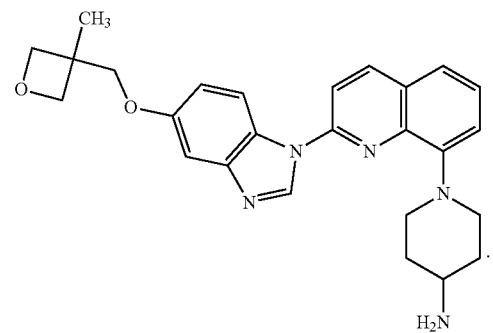

13 Claims, No Drawings

(56) References Cited

OTHER PUBLICATIONS

Boddu et al. Blood Advances. 2017. 1(19): 1546-1550 (Year: 2017).*
Papaemmanuil et al New England J Med. Jun. 2016. 374(23): 2209-2221 and Supplementary Appendix (Year: 2016).*
Goldberg et al. Blood. 2018. 132(Supplement 1): 1436 (Year: 2018).*
Clinical Trials.gov ID NCT02283177, National Library of Medicine, NCBI, available via URL: < clinicaltrials.gov/study/NCT02283177>, printed on Nov. 28, 2023; study started Jan. 2015 (Year: 2023).*
Stone et al. J Clin Oncology. May 2017. 35(15), Supplement, Abstract 7016 (Year: 2017).*
Wang et al EHA Library. Abstract release date May 19, 2016, poster presentation Jun. 10, 2016, p. 186, available via URL: <ibrary.ehaweb.org/eha/2016/21st/133174/eunice.wang.safety.study.of.crenolanib.a.type.i.flt3.inhibitor.with.cytarabine.html> (Year: 2016).*
Clinical Trials.gov ID NCT02283177. National Library of Medicine, NCBI, available via URL: < clinicaltrials.gov/study/NCT02283177?term=NCT02283177&rank=1&a=1&tab=history>, record dated Nov. 3, 2014 (Year: 2014).*
Yee, et al. "SU5416 and SU5614 inhibit kinase activity of wild-type and mutant FLT3 receptor tyrosine kinase" Blood, Oct. 2002; 100(8): 2941-2949.
Papaemmanuil, E. "Genomic Classification and Prognosis in Acute Myeloid Leukemia,"—Supplementary Appendix, 275 pp, New England J. Med. vol. 374, No. 23, pp. 2209-2221 (Jun. 9, 2016).
Vanderwalde, A. "Genetics of Acute Myeloid Leukemia," available at http://emedicine.medscape.com/article/1936033-overview (last updated Apr. 1, 2016).
Smith, et al. "Single agent CEP-701, a novel FLT3 inhibitor, shows biologic and clinical activity in patients with relapsed or refractory acute myeloid leukemia Blood", May 2004; 103: 3669-3676.
Sportoletti, et al. "Mouse Models of NPM1-mutated Acute Myeloid Leukemia: Biological and Clinical Implications." Leukemia. vol. 29, No. 2, pp. 269-278 (Feb. 2015).
Stirewalt, et al. "The role of FLT3 in haematopoietic malignancies" Nature Reviews Cancer. 2003; 3:650-665.
Stone, et al. PKC-412 FLT3 inhibitor therapy in AML: results of a phase II trials. Ann. Hematol. 2004; 83 Suppl 1: S89-90.
Tao, et al. "Prognosis and Outcome of Patients with Acute Myeloid Leukemia Based on FLT3-ITD Mutations with or without Additional Abnormal Cytogenetics." Oncology Letters. vol. 18, No. 6, pp. 6766-6774 (Nov. 5, 2019).
Thanasopoulou, et al. "Potent Co-operation between the NUP98-NSD1 Fusion and the FLT3-ITD Mutation in Acute Myeloid Leukemia Induction." Haematologica. vol. 99, No. 9, pp. 1465-1471 (Jun. 22, 2014).
Thiede, et al. "Analysis of FLT3-activating mutations in 979 patients with acute myelogenous leukemia: association with FAB subtypes and identification of subgroups with poor prognosis" Blood. 2002; 99:4326-4335.
Tse, et al. "Inhibition of FLT3-mediated transformation by use of a tyrosine kinase inhibitor" Leukemia. Jul. 2001; 15(7):1001-1010.
Abu-Duhier, et al. "FLT3 internal tandem duplication mutations in adult acute myeloid leukemia define a high-risk group" British Journal of Hematology. Jun. 7, 2000; 111: 190-195.
Amin, et al. "Having a higher blast percentage in circulation than bone marrow; clinical implications in myelodysplastic syndrome and acute lymphoid and myeloid leukemias" Leukemia. Jul. 28, 2005: 19: 1567-72.
Aslanyan, et al. "Clinical and Biological Impact of TET2 Mutations and Expression in Younger Adult AML Patients Treated within the EORTC/GIMEMA AML-12 Clinical Trial." Ann Hematol. vol. 93, No. 8, pp. 1401-1412 (Jul. 6, 2014).
Bacher, et al. "Prognostic relevance of FLT3-TKD mutations in AML: the combination matters—an analysis of 3082 patients" Blood. Mar. 1, 2008; 111:2527-2537.

Bains, et al. "FLT3 and NPM1 mutations in myelodysplastic syndromes: Frequency and potential value for predicting progression to acute myeloid leukemia" American Journal of Clinical Pathology. Jan. 2011; 135: 62-69.
Ball, et al. "RAS Mutations are Independently Associated with Decreased Overall Survival and Event-free Survival in Patients with AML Receiving Induction Chemotherapy." Blood. vol. 134, No. Supp_1, pp. 18 (Nov. 13, 2019).
Bhamidpati, et al. FLT3 mutations in myelodysplastic syndromes (MDS) and chronic myelomonocytic leukemia (CMML). 2012. Journal of Clinical Oncology. Suppl; abstract only 6597.
Bisio, et al. "NUP98-fusion Transcripts Characterize Different Biological Entities Within Acute Myeloid Leukemia." Leukemia. vol. 31, No. 4, pp. 974-977 (Apr. 2017).
Boddu, et al. "Influence of IDH on FLT3-ITD Status in Newly Diagnosed AML." Leukemia. vol. 31, No. 11, pp. 2526-2529 (Jul. 29, 2017).
Borthakur, et al. "Phase I study of sorafenib in patients with refractory or relapsed acute leukemias." Haematologica. Jan. 2011; 96: 62-8. Epub Oct. 15, 2010.
Cheson, et al. "Revised Recommendations of the International Working Group for Diagnosis, Standardization of Response Criteria, Treatment Outcomes, and Reporting Standards for Therapeutic Trials in Acute Myeloid Leukemia" J Clin Oncol. Dec. 15, 2003; 21: 4642-4649.
Chilton, et al. "The Prognostic Significance of Trisomy 4 in Acute Myeloid Leukaemia is Dependent on Age and Additional Abnormalities." Leukemia. vol. 30, No. 11, pp. 2264-2267 (Nov. 3, 2016).
Cortes, et al. "A phase II open-label, AC220 monotherapy efficacy study in patients with refractory/relapsed FLT3-ITD positive acute myeloid leukemia: updated interim results" Blood (ASH Annual Meeting Abstracts) Dec. 2011.
Cortes, et al. "AC220, a potent, selective, second generation FLT3 receptor tyrosine kinase (RTK) inhibitor, in a first-in-human (FIH) phase I AML study" Blood (ASH Annual Meeting Abstracts) Nov. 2009.
Dohner, et al. "Diagnosis and management of AML in adults: 2017 ELN recommendations from an international expert panel," Blood. vol. 129, No. 3, pp. 424-447 (Nov. 28, 2016).
Drexler, et al. "Expression of FLT3 receptor and response to FLT3 ligand by leukemic cells" Leukemia. Apr. 10, 1996; 10:588-599 (Abstract Only).
Falini, et al. "NPM1-mutated acute myeloid leukemia: from bench to bedside." Blood. 136;15:1707-1721 (Oct. 8, 2020).
Gilliland, et al. "The roles of FLT3 in hematopoiesis and leukemia." Blood. Sep. 1, 2002; 100: 1532-1542.
Greenblatt, et al. "Knock-in of a FLT3-ITD Mutation Cooperates with a NUP98-HOXD13 Fusion to Generate Acute Myeloid Leukemia in a Mouse model." Blood. vol. 119, No. 12, pp. 2883-2894 (Mar. 22, 2012).
Griswold, et al. "Effects of MLN518, a dual FLT3 and KIT inhibitor, on normal and malignant hematopoiesis" Blood. Nov. 2004; 104 (9): 2912-2918.
Hou, et al. "Splicing Factor Mutations Predict Poor Prognosis in Patients with De Novo Acute Myeloid Leukemia." Oncotarget. vol. 7, No. 8, pp. 9084-9101 (Feb. 23, 2016).
Kindler, et al. "FLT3 as a therapeutic target in AML: still challenging after all these years" Blood. Dec. 9, 2010; 116:5089-102.
Kiyoi et al. "Prognostic implication of FLT3 and N-RAS gene mutations in acute myeloid leukemia" Blood. May 1, 1999; 93:3074-3080.
Kiyoi, et al. "Internal tandem duplication of FLT3 associated with leukocytosis in acute promyelocytic leukemia" Leukemia Study Group of the Ministry of Health and Welfare (Kohseisho). Leukemia. 1997; 11: 1447-1452.
Kiyoi, et al. "Internal tandem duplication of the FLT3 gene is a novel modality of elongation mutation which causes constitutive activation of the product" Leukemia. 1998; 12:1333-1337.
Kottaridis, et al. "The presence of a FLT3 internal tandem duplication in patients with acute myeloid leukemia (AML) adds important prognostic information to cytogenetic risk group and response to the first cycle of chemotherapy: analysis of 854 patients from the

(56) References Cited

OTHER PUBLICATIONS

United Kingdom Medical Research Counsel AML 10 and 12 trials" Blood. Sep. 15, 2001; 98: 1742-1759.

Levis, et al. "A FLT3 tyrosine kinase inhibitor is selectively cytotoxic to acute myeloid leukemia blasts harboring FLT3 internal tandem duplication mutations" Blood. Aug. 1, 2001; 98(3): 885-887.

Levis, et al. "Small Moleucle FLT3 Tyrosine Kinase Inhibitors" Current Pharmaceutical Design. 2004, 10, 1183-1193.

Lewis, et al. "Phase I study of the safety, tolerability, and pharmacokinetics of oral CP-868-596, a highly specific platelet-derived growth factor receptor tyrosine kinase inhibitor in patients with advanced cancers" J Clin Oncol. Nov. 1, 2009; 27(31), 5262-5269.

Mendler, J. "RUNX1 Mutations Are Associated With Poor Outcome in Younger and Older Patients With Cytogenetically Normal Acute Myeloid Leukemia and With Distinct Gene and MicroRNA Expression Signatures," J. Clin. Oncol. vol. 30, No. 25, pp. 3109-3118 (Jul. 2, 2012).

Michmerhuizen, et al. "Mechanistic Insights and Potential Therapeutic Approaches for NUP98-Rearranged Hematologic Malignancies." Blood. vol. 136, No. 20, pp. 2275-2289 (Nov. 12, 2020).

Murata, et al. "Selective cytotoxic mechanism of GTP-14564, a novel tyrosine kinase inhibitor in leukemia cells expressing a constitutively active Fms-like tyrosine kinase 3 (FLT3)" J Biol Chem. Aug. 29, 2003; 278 (35): 32892-32898 [Epub Jun. 18, 2003].

Nakao, et al. Abstract Only: "Internal tandem duplication of the FLT3 gene found in acute myeloid leukemia." Leukemia. 1996; 10:1911-1918.

O"Farrell et al. "SU11248 is a novel FLT3 tyrosine kinase inhibitor with potent activity in vitro and in vivo" Blood, May 2003; 101(9): 3597-3605.

Papaemmanuil, E. "Genomic Classification and Prognosis in Acute Myeloid Leukemia," New England J. Med. vol. 374, No. 23, pp. 2209-2221 (Jun. 9, 2016).

Paschka, et al., "Wilms" Tumor 1 Gene Mutations Independently Predict Poor Outcome in Patients with Cytogenetically Normal Acute Myeloid Leukemia: a cancer and leukemia group B study. J Clin Oncol. vol. 26, No. 28, pp. 4595-4602 (Oct. 1, 2008).

Patel, et al. "Prognostic Relevance of Integrated Genetic Profiling in Acute Myeloid Leukemia," New England J. Med. vol. 366, No. 12, pp. 1079-1189 (Mar. 22, 2012).

Pratcorona, et al., "Acquired Mutations in ASXL1 in Acute Myeloid Leukemia: Prevalence and Prognostic Value." Haematologica. vol. 97, No. 3, pp. 388-392 (Mar. 2012).

Renneville, et al. "The Favorable Impact of CEBPA Mutations in Patients with Acute Myeloid Leukemia is Only Observed in the Absence of Associated Cytogenetic Abnormalities and FLT3 Internal Duplication." Blood. vol. 113, No. 21, pp. 5090-5093 (May 21, 2009).

Schnittger, et al. "Analysis of FLT3 length mutations in 1003 patients with acute myeloid leukemia: correlation to cytogenetics, FAB subtype, and prognosis in the AMLCG study and usefulness as a marker for the detection of minimal residual disease" Blood. 2002; 100: 59-66.

Small D. "FLT3 mutations: biology and treatment" Hematology Am Soc Hematol Educ Program. 2006: 178-84.

Yamamoto, et al. "Activating mutation of D835 within the activation loop of FLT3 in human hematologic malignancies" Blood. 2001; 97"2434-2439.

Ahsan, et al. "Mechanism of Resistance to EGFR Tyrosine kinase Inhibitors and Therapeutic Approaches : An Update" Adv Exp Med Biol, 2016.

Badar, et al. Detectable FLT3-ITD or RAS mutation at the time of transformation from MDS to AML predicts for very poor outcomes. Leuk Res Dec. 2015;39:1367-74.

Belchis, et al. "Heterogeity of resistance mutations detectable by next-generation sequencing in TKI-treated lung adenocarcinoma" Oncotarget, vol. 7. No. 29, Jun. 2016.

Chabon, et al. "Circulating tumour DNA profiling reveals heterogeity of EGFR inhibitor resistance mechanisms in lung cancer patients" Nature Communications, Jun. 2016.

Ching, et al. Abstract Only LB-215 "Analysis of mutations associated with response to glasdegib in acute myeloid leukemia (AML) and myelodysplastic syndrome (MDS)" Cancer Research, 2018.

De Melo Galiato, et al. "Mechanisms of resistance and sensitivity to anti-HER2 therapies and anti-HER2 breast cancer" Oncotarget, vol. 7, No. 39. Jan. 2016.

Dohner, et al., "Diagnosis and management of AML in adults: 2017 ELN recommendations from an international expert panel" Blood, Jan. 26, 2017. 129(4): p. 424-447.

Engleman, et al. "MET Amplification Leads Gefitinib Resistance in Lung by activating ERBB3 Signaling" Science, May 2007.

Grunwald, et al. "FLT3 inhibitors for acute myeloid leukemia: a reviw for their efficacy and mechanisms of resistance" International Journal of Hematology, 2013.

Heidel, et al. "Clinical resistance to kinase inhibitor PKC412 in acute myeloid leukemia by mutation of Asn-676 in the FLY3 tyrosine kinase domian" Neoplasia, Jan. 1, 2006.

Ho, et al. "Acquired BRAF V600E Mutation as Resistant Mechanism after Treatment with Osimertinib" Journal of Thoracic Oncology, 2016.

Hocchaus, et al. "Molecular and and chromosomal mechanisms of resistance to Imatinib (STI571) therapy" Leukemia, 2002.

Hong, et al. "Src Mutation Induces Acquired Lapatinib Resistance in ERBB2-Amplified Human Gastroesophageal Adenocarcinoma Models" PLOS One, Oct. 2014.

Indian Patent Office, Examination Report for India Patent Appl. No. 201917020799, dated Sep. 30, 2021.

Japan Patent Office, Examination Report for Japan Patent Appl No. 2018-506309, dated Apr. 6, 2021, 6 pp.

Katayama, et al. "Mechanisms of acquired crizotinib resistance in ALK-rearranged lung cancer" Science Translational Medicine, Feb. 2012.

Klco, et al. "Functional heterogeneity of genetically defined subclones in acute myeloid leukemia" Cancer Cell, Mar. 17, 2014.

Martin, et al., "Genomics in actue myeloid luekemia: from identification to personalization", Rhode Island Medical Journal, Nov. 2015, vol. 98, No. 11, pp. 27-30.

Mendler, et al., "RUNX1 mutations are associated with poor outcome in younger and older patients with cytogenetically normal acute myeloid leukemia and with distinct gene and MicroRNA expression signatures" J Clin Oncol, Sep. 1, 2012. 30(25): p. 3109-18.

Nakagawa, et al., "EGFR-TKI resistance due to BIM polymorphism can be circumvented in combination with HDAC Inhibition" Cancer Res, Apr. 2013. 73(8): p. 2428-34.

Nazarian, et al., "Melanomas acquire resistance to B-RAF(V600E) inhibition by RTK or N-RAS upregulation" Nature, Dec. 16, 2010. 468(7326): p. 973-7.

Odonnell, et al., "Acute myeloid leukemia", Journal of the National Comprehensive Cancer Network, Mar. 2011, vol. 9, No. 3, pp. 280-317.

Papadimitrikopoulou, et al., "LBA51Analysis of resistance mechanisms to osimertinib in patients with EGFR T790M advanced NSCLC from the AURA3 study" Abstract Only, Annals of Oncology, 2018. 29(suppl_8).

Paschka, et al., "Wilms tumor 1 gene mutations independently predict poor outcome in adults with cytogenetically normal acute myeloid leukemia: a cancer and leukemia group B study" J Clin Oncol, Oct. 1, 2008. 26(28): p. 4595-602.

Patel, et al. "Prognostic relevance of integrated genetic profiling in acute myeloid leukemia" N Engl J Med, Mar. 22, 2012;366:1079-89.

Piccaluga, et al., "Imatinib mesylate in the treatment of hematologic malignancies" Expert Opin Biol Ther, 2007. 7 (10): p. 1597-611.

Quentmeier, et al., "BCR-ABL1-independent PI3Kinase activation causing imatinib-resistance" J Hematol Oncol, 2011. 4: p. 6.

Slany, et al. "The molecular Biology of Mixed Lineage Leukemia" Hematologica, 2009.

(56) References Cited

OTHER PUBLICATIONS

Smith, et al., "FLT3 D835 mutations confer differential resistance to type II FLT3 inhibitors" Leukemia, 2015. 29(12): p. 2390-2, accepted article preview online Jun. 25, 2015.
Smith, et al., "Validation of ITD mutations in FLT3 as a therapeutic target in human acute myeloid leukaemia" Nature, 2012. 485(7397): p. 260-3.
Wagle, et al., "Dissecting Therapeutic Resistance to RAF Inhibition in Melanoma by Tumor Genomic Profiling" Journal of Clinical Oncology, Aug. 2011. 29(22): p. 3085-3096.
Weisberg, et al., "Drug resistance in mutant FLT3-positive AML" Oncogene, 2010. 29(37): p. 5120-34, published online Jul. 12, 2010.
Welsh et al: "Bioinformatics analysis to determine prognostic mutations of 72 de novo acute myeloid leukemia cases from the cancer genome atlas with 23 most common mutations and no abnormal cytogenetics", Annals of Clinical and Laboratory Science, 45(5), Jan. 1, 2015, pp. 515-521.
Woyach, et al., "Resistance mechanisms for the Brutons tyrosine kinase inhibitor ibrutinib" N Engl J Med, Jun. 2014. 370(24): p. 2286-94.
Zorn, et al. "Crystal Structure of the FLT3 Kinase DomainBound to the Inhibitor Quizartinib (AC220)" PLOS One, Apr. 2, 2015.
Arber, et al. "The 2016 revision to the World Health Organization classification of myeloid neoplasms and acute leukemia" Blood, May 19, 2016. 127(20): p. 2391-405.
Arber, et al. "Initial Diagnostic Workup of Acute Leukemia: Guideline From the College of American Pathologists and the American Society of Hematology" Arch Pathol Lab Med, Oct. 2017. 141(10): p. 1342-1393.
Bakshi, S., et al. "Trisomy 8 in leukemia: A GCRI experience," Indian J Hum Genet. 2012;18:106-108.
Banescu, et al. "The Value of FLT3, NPM1 and DNMT3A Gene Mutation Analysis in Acute Myeloid Leukemia Diagnosis" Revista Romana de Medicina de Laborator, 2019. 27(3): p. 239-243.
Cancer Genome Atlas Research, et al., "Genomic and epigenomic landscapes of adult de novo acute myeloid leukemia" with Supplemental Appendix (116 pages), N Engl J Med, May 30, 2013. 368(22): p. 2059-74.
ClinicalTrials.gov (NCT01522469) first, 3 pp.
ClinicalTrials.gov (NCT01657682) first.
ClinicalTrials.gov (NCT02283177) first.
ClinicalTrials.gov (NCT02400281) first.
ClinicalTrials.gov (NCT02626338) first.
Dicker, et al. "Trisomy 13 is strongly associated with AML1/RUNX1 mutations and increased FLT3 expression in acute myeloid leukemia," Blood. 2007;110:1308-1316.
DiNardo, et al. "Acute Myeloid Leukemia: from Mutation Profiling to Treatment Decisions" Curr Hematol Malig Rep, 2019.
Ding, et al. "Clonal evolution in relapsed acute myeloid leukaemia revealed by whole-genome sequencing" Nature, 2012. 481(7382): p. 506-10.
European Patent Office, European Search Report for EP Appl. No. 1786388.6 dated Apr. 25, 2019, 13 pp.
Fischer, et al. "Phase IIB trial of oral Midostaurin (PKC412), the FMS-like tyrosine kinase 3 receptor (FLT3) and multi-targeted kinase inhibitor, in patients with acute myeloid leukemia and high-risk myelodysplastic syndrome with either wild-type or mutated FLT3" J Clin Oncol, 2010. 28(28): p. 4339-45.
Fitchen, et al. "Genetically Engineered Protection Against Viruses in Transgenic Plants" (1993) Annu Rev. Microbiol. 47:739-764.
Galanis, et al. "Abstract 3660: Crenolanib: A next generation FLT3 Inhibitor" DOI: 10.1158/1538-7445 AM2012-3660, Published Apr. 15, 2012, Cancer Research, vol. 72, Issue 8 Supplement, Abstract Only.
GeneCards, "GeneCards for DNMT3A" available via URL: <genecards.org/cgi-bin/carddisp.pl?gene=DNMT3A >, printed on Feb. 4, 2020, pp. 1-30 (Year: 2020).
Hattersley, et al. "What makes a good genetic association study?" Genetic Epidemiology 5, Lancet, vol. 366, Oct. 8, 2005, 1315-1323.
Herold, et al. "Isolated trisomy 13 defines a homogeneous AML subgroup with high frequency of mutations in spliceosome genes and poor prognosis," Blood. 2014;124:1304-1311.
Hirsch, et al. "Genetic hierarchy and temporal variegation in the clonal history of acute myeloid leukaemia" Nat Commun, 2016. 7: p. 12475.
Hirschorn, et al. "A Comprehensive Review of Genetic Association Studies" Mar./Apr. 2002, vol. 4, No. 2, 45-61.
Korean Intellectual Property Office, International Search Report and Written Opinion for PCT/US2013/064821 dated Dec. 26, 2013, 5 pp.
Korean Intellectual Property Office, International Search Report and Written Opinion for PCT/US2017/059377 dated Oct. 31, 2017, 21 pp.
Levis, et al. "Results from a randomized trial of salvage chemotherapy followed by lestaurtinib for patients with FLT3 mutant AML in first relapse," Blood. Mar. 24, 2011;117:3294-3301.
Marcucci, et al. "Age-Related Prognostic Impact of Different Types of DNMT3A Mutations in Adults With Primary Cytogenetically Normal Acute Myeloid Leukemia" Journal of Clinical Oncology, vol. 30, No. 7, Mar. 1, 2012, 742-750.
Martin, et al. "Genomics in acute myeloid leukemia: from identification to personalization" Rhode Island Medical Journal, 2015, vol. 98, No. 11, pp. 27-30.
McMahon, et al. "Clonal selection with Ras pathway activation mediates secondary clinical resistance to selective FLT3 inhibition in acute myeloid leukemia" Cancer Discov, 2019.
Mead, et al. "FLT3 tyrosine kinase domain mutations are biologically distinct from and have a significantly more favorable prognosis than FLT3 internal tandem duplications in patients with acute myeloid leukemia" Blood. Apr. 24, 2007; 110: 1262.
Metzeler, et al. "Spectrum and prognostic relevance of driver gene mutations in acute myeloid leukemia" Blood, 2016. 128(5): p. 686-98.
Michael, et al. "Phase Ib study of CP-868,596, a PDGFR inhibitor, combined with docetaxel with or without axitinib, a VEGFR inhibitor" British Journal of Cancer (published online Oct. 19, 2010) 103, 1554-1561.
O'Donnell, et al. "Acute myeloid leukemia" Journal of the National Comprehensive Cancer Network, 2011, vol. 9, No. 3, pp. 280-317.
Podoltsev, et al. "Selecting initial treatment of acute myeloid leukaemia in older adults" Blood Reviews, 31, (2017) 46-62.
Randhawa, et al. "Results of a Phase II Study of Crenolanib in Relapsed/Refractory Acute Myeloid Leukemia Patients (Pts) with Activating FLT3 Mutations" Blood, 2014. 124(21): p. 389-389.
Randhawa, et al. "Results of a Phase II Study of Crenolanib in Relapsed/Refractory Acute Myeloid Leukemia Patients with Activating FLT3 Mutations" Abstract Only, Blood, vol. 124, Issue 21 Blood Journal, Dec. 4, 2014, XP055570030.
Sclenk, et al. "Mutations and Treatment Outcome in Cytogenetically Normal Acute Myeloid Leukemia" NEJM. May 1, 2008; 358: 1909.
Takahashi, Shinichiro "Downstream molecular pathways of FLT3 in the pathogenesis of acute myeloid leukemia biology and therapeutic implications" Journal of Hematology & Oncology, 2011, 4:13.
Thangavelu, et al. "Complete molecular risk stratification of de novo acute myeloid leukemia with intermediate cytogenetics using a nine-gene panel", Blood Journal, American Society of Hematology, 2014, vol. 124, No. 21, p. 2333.
Wang, et al. "Safety Study of Crenolanib, a Type I FLT3 Inhibitor, with Cytarabine/Daunorubicin or Cytarabine/Idarubicin Induction and High-Does Cytarabine Consolidation in Newly Diagnosed FLT3+ AML" EHA Learning Center, Jun. 10, 2016; 133174 Abstract Only.
Welsh, et al. "Bioinformatics analysis to determine prognostic mutations of 72 de novo acute myeloid leukemia cases from the Cancer Genome Atlas (TCGA) with 23 most common mutations and no abnormal cytogentics" Annals of Clinical & Laboratory Science, 2015, vol. 45, No. 5, pp. 515-521.
Zhang, et al. "Association between increased mutation rates in DNMT3A and FLT3-ITD and poor prognosis of patients with acute myeloid leukemia" Experimental and Therapeutic Medicine, 2019.

(56) References Cited

OTHER PUBLICATIONS

Zhang, et al. "Clinical Resistance to Crenolanib in Acute Myeloid Leukemia Due to Diverse Molecular Mechanisms" Nature Communications, Jan. 2019, 10(1): 244, p. 1-13.
Ammatuna, et al. "Rapid Detection of Nucleophosmin (NPM1) Mutations in Acute Myeloid Leukemia by Denaturing HPLC" Clinical Chemistry 51, No. 11, 2005, 2165-2167.
Calvo, et al. "Detection of the nucleophosmin gene mutations in acute myelogenous leukemia through RT-PCR and polyacrylamide gel electrophoresis" European Journal of Haematology ISSN 0902-4441, 2008, Journal Compilation 82 (69-72).
Dohner, et al., "Diagnosis and management of acute myeloid leukemia in adults: recommendations from an international expert panel, on behalf of the European LeukemiaNet" Blood, Jan. 21, 2010, vol. 115, No. 3.
Falini, et al. "Cytoplasmic Nucleophosmin in Acute Myelogenous Leukemia with a Normal Karyotype" N Engl J Med 352;3 www.nejm.org Jan. 20, 2005.
Lipson, et al. "Identification of Actionable Genomic Alterations in Hematologic Malignancies by a Clinical Next Generation Sequencing-Based Assay" Blood (2013) 122 (21):230, http://doi.org/10.1182/blood.V122.21.230.230.
Orrick, et al. "Comparison of Nucleolar Proteins of Normal Rat Liver and Novikoff Hepatoma Ascites Cells by Two-Dimensional Polyacrylamide Gel Electrophoresis" Proc. Natl. Acad. Sci. USA, vol. 70, No. 5, pp. 1316-1320, May 1973.
Rau, et al. "Nucleophosmin (NPM1) mutations in adult and childhood acute myeloid leukaemia: towards definition of a new leukaemia entity" Hematological Oncology, Hematol Oncol 2009; 27: 171-181, Published online Jul. 1, 2009 in Wiley InterScience, (www.interscience.wiley.com) DOI: 10.1002/hon.904.
Salipante, et al. "Detection of minimal residual disease in NPM1-mutated acute myeloid leukemia by next-generation sequencing" Modern Pathology (2014) 27, 1438-1446.
Shen, et al. "Clinical applications of next generation sequencing in cancer: from panels, to exomes, to genomes" Frontiers in Genetics, published: Jun. 17, 2015, doi: 10.3389/fgene.2015.00215.
Vardiman, et al. "The 2008 revision of the World Health Organization (WHO) classification of myeloid neoplasms and acute leukemia: rationale and important changes" Blood, Jul. 30, 2009 vol. 114, No. 5.
Verhaak, et al. "Mutations in nucleophosmin (NPM1) in acute myeloid leukemia (AML): association with other gene abnormalities and previously established gene expression signatures and their favorable prognostic significance" Blood, Dec. 1, 2005 vol. 106, No. 12.

* cited by examiner

CRENOLANIB FOR TREATING FLT3 MUTATED PROLIFERATIVE DISORDERS ASSOCIATED MUTATIONS

CROSS-REFERENCE TO RELATED APPLICATIONS

This application is a continuation-in-part of U.S. patent application Ser. No. 15/799,684 filed on Oct. 31, 2017, which claims priority to U.S. Provisional Application Ser. No. 62/416,475, filed Nov. 2, 2016, the entire contents of which are incorporated herein by reference.

STATEMENT OF FEDERALLY FUNDED RESEARCH

Not applicable.

TECHNICAL FIELD OF THE INVENTION

The present invention relates in general to the use of Crenolanib in a pharmaceutically acceptable salt form for the treatment of proliferative disorder(s), characterized by mutations to particular tyrosine kinase pathways, and to a method of treatment of warm-blooded animals, preferably humans, in which a therapeutically effective dose of Crenolanib is administered to a subject suffering from said proliferative disorder.

INCORPORATION-BY-REFERENCE OF MATERIALS FILED ON COMPACT DISC

Not applicable.

BACKGROUND OF THE INVENTION

Without limiting the scope of the invention, its background is described in connection with protein kinases.

Protein kinases are enzymes that chemically modify other proteins by catalyzing the transfer of gamma phosphates from nucleotide triphosphates, often adenosine triphosphate (ATP), and covalently attaching them to a free hydroxyl group of amino acid residues serine, threonine and tyrosine.

Approximately 30% of all human proteins may be modified by kinase activity. Protein kinases direct the enzymatic activity, cellular location and primary function/association of substrate proteins and regulate cell signal transduction and cell function coordination.

Research studies have shown that aberrant expression of normal or mutated protein kinases are frequently associated with the formation and propagation of a number of diseases. Studies have shown that overexpression or inappropriate protein kinase expression is associated with cancer, cardiovascular disease, rheumatoid arthritis, diabetes, ocular disease, neurologic disorders and autoimmune disease. Thus, investigating compounds that potently inhibit the activity and function of protein kinases will allow for a greater understanding of the physiological roles of protein kinases.

The FMS-like tyrosine kinase 3 (FLT3) gene encodes a membrane bound receptor tyrosine kinase that affects hematopoiesis leading to hematological disorders and malignancies. See Drexler, H G et al. Expression of FLT3 receptor and response to FLT3 ligand by leukemic cells. Leukemia. 1996; 10:588-599; Gilliland, DG and JD Griffin. The roles of FLT3 in hematopoiesis and leukemia. Blood. 2002; 100:1532-1542; Stirewalt, DL and JP Radich. The role of FLT3 in hematopoietic malignancies. Nat Rev Cancer. 2003; 3:650-665. Activation of FLT3 receptor tyrosine kinases is initiated through the binding of the FLT3 ligand (FLT3L) to the FLT3 receptor, also known as Stem cell tyrosine kinase-1 (STK-1) and fetal liver kinase-2 (flk-2), which is expressed on hematopoietic progenitor and stem cells.

FLT3 is one of the most frequently mutated genes in hematological malignancies, present in approximately 30% of adult acute myeloid leukemias (AML). See Nakao M, S Yokota and T Iwai. Internal tandem duplication of the FLT3 gene found in acute myeloid leukemia. Leukemia. 1996; 10:1911-1918; H Kiyoi, M Towatari and S Yokota. Internal Tandem duplication of the FLT3 gene is a novel modality of elongation mutation, which causes constitutive activation of the product. Leukemia. 1998; 12:1333-1337; PD Kottaridis, RE Gale, et al. The presence of a FLT3 internal tandem duplication in patients with acute myeloid leukemia (AML) adds important prognostic information to cytogenetic risk group and response to the first cycle of chemotherapy: analysis of 854 patients from the United Kingdom Medical Research Council AML 10 and 12 trials. Blood. 2001; 98:1742-1759; Yamamoto Y, Kiyoi H, Nakano Y. Activating mutation of D835 within the activation loop of FLT3 in human hematologic malignancies. Blood. 2001; 97:2434-2439; Thiede C, C Steudel, Mohr B. Analysis of FLT3-activating mutations in 979 patients with acute myelogenous leukemia: association with FAB subtypes and identification of subgroups with poor prognosis. Blood. 2002; 99:4326-4335. FLT3 mutations have been detected in approximately 2% of patients diagnosed with intermediate and high risk myelodysplastic syndrome (MDS). See S Bains, Luthra R, Medeiros L J and Zuo Z. FLT3 and NPM1 mutations in myelodysplastic syndromes: Frequency and potential value for predicting progression to acute myeloid leukemia. American Journal of Clinical Pathology. January 2011; 135:62-69;PK Bhamidipati, Daver N G, Kantarjian H, et al. FLT3 mutations in myelodysplastic syndromes (MDS) and chronic myelomonocytic leukemia (CMML). 2012. Journal of Clinical Oncology. Suppl; abstract 6597. Like MDS, the number of FLT3 mutations in patients with acute promyelocytic leukemia (APL) is small. The most common FLT3 mutations are internal tandem duplications (ITDs) that lead to in-frame insertions within the juxtamembrane domain of the FLT3 receptor. FLT3-ITD mutations have been reported in 15-35% of adult AML patients. See Nakao M, S Yokota and T Iwai. Internal tandem duplication of the FLT3 gene found in acute myeloid leukemia. Leukemia. 1996; 10:1911-1918; H Kiyoi, M Towatari and S Yokota. Internal Tandem duplication of the FLT3 gene is a novel modality of elongation mutation, which causes constitutive activation of the product. Leukemia. 1998; 12:1333-1337; H Kiyoi, T Naoe and S Yokota. Internal tandem duplication of FLT3 associated with leukocytosis in acute promyelocytic leukemia. Leukemia Study Group of the Ministry of Health and Welfare (Kohseisho). Leukemia. 1997; 11:1447-1452; S Schnittger, C Schoch and M Duga. Analysis of FLT3 length mutations in 1003 patients with acute myeloid leukemia: correlation to cytogenetics, FAB subtype, and prognosis in the AMLCG study and usefulness as a marker for the detection of minimal residual disease. Blood. 2002; 100:59-66. A FLT3-ITD mutation is an independent predictor of poor patient prognosis and is associated with increased relapse risk after standard chemotherapy, and decreased disease free and overall survival. See FM Abu-Duhier, Goodeve A C, Wilson G A, et al. FLT3 internal tandem duplication mutations in adult acute myeloid leukemia define a high risk group. British Journal of Haematology. 2000; 111:190-195; H Kiyoi, T Naoe, Y Nakano, et al.

Prognostic implication of FLT3 and N-RAS gene mutations in acute myeloid leukemia. Blood. 1999; 93:3074-3080. Less frequent are FLT3 point mutations that arise in the activation loop of the FLT3 receptor. The most commonly affected codon is aspartate 835 (D835). Nucleotide substitutions of the D835 residue occur in approximately 5-10% of adult acute myeloid leukemia patients. See DL Stirewalt and JP Radich. The role of FLT3 in haematopoietic malignancies. Nature Reviews Cancer. 2003; 3:650-665; Y Yamamoto, H Kiyoi and Y Nakano, et al. Activating mutation of D835 within the activation loop of FLT3 in human hematologic malignancies. Blood. 2001; 97:2434-2439; C Thiede, Steudal C, Mohr B, et al. Analysis of FLT3-activating mutations in 979 patients with acute myelogenous leukemia: association with FAB subtypes and identification of subgroups with poor prognosis. Blood. 2002; 99:4326-4335; U Bacher, Haferlach C, W Kern, et al. Prognostic relevance of FLT3-TKD mutations in AML: the combination matters—an analysis of 3082 patients. Blood. 2008; 111:2527-2537.

The heightened frequency of constitutively activated mutant FLT3 in adult AML has made the FLT3 gene a highly attractive drug target in this tumor type. Several FLT3 inhibitors with varying degrees of potency and selectivity for the target have been or are currently being investigated and examined in AML patients. See T Kindler, Lipka D B, and Fischer T. FLT3 as a therapeutic target in AML: still challenging after all these years. Blood.2010; 116:5089-102.

FLT3 kinase inhibitors known in the art include Lestaurtinib (also known as CEP 701, formerly KT-555, Kyowa Hakko, licensed to Cephalon); CHIR-258 (Chiron Corp.); EB10 and IMC-EB10 (ImClone Systems Inc.); Midostaurin (also known as PKC412, Novartis A G); Tandutinib (also known as MLN-518, formerly CT53518, COR Therapeutics Inc., licensed to Millennium Pharmaceuticals Inc.); Sunitinib (also known as SU11248, Pfizer USA); Quizartinib (also known as AC220, Ambit Biosciences); XL 999 (Exelixis USA, licensed to Symphony Evolution, Inc.); GTP 14564 (Merck Biosciences U K); AG1295 and AG1296; CEP-5214 and CEP-7055 (Cephalon). The following PCT International Applications and U.S. patent applications disclose additional kinase modulators, including modulators of FLT3: WO 2002032861, WO 2002092599, WO 2003035009, WO 2003024931, WO 2003077347, WO 2003057690, WO 2003099771, WO 2004005281, WO 2004016597, WO 2004018419, WO 2004039782, WO 2004043389, WO 2004046120, WO 2004058749, WO 2004058749, WO 2003024969 and U.S Patent Application Publication No. 2004/0049032. See also Levis M, KF Tse, et al. 2001 "A FLT3 tyrosine kinase inhibitor is selectively cytotoxic to acute myeloid leukemia blasts harboring FLT3 internal tandem duplication mutations." Blood 98 (3): 885-887; Tse K F, et al., Inhibition of FLT3-mediated transformation by use of a tyrosine kinase inhibitor. Leukemia. July 2001; 15 (7): 1001-1010; Smith, B. Douglas et al., Single agent CEP-701, a novel FLT3 inhibitor, shows biologic and clinical activity in patients with relapsed or refractory acute myeloid leukemia Blood, May 2004; 103:3669-3676; Griswold, Ian J. et al., Effects of MLN518, A Dual FLT3 and KIT Inhibitor, on Normal and Malignant Hematopoiesis. Blood, November 2004; 104 (9): 2912-2918 [Epub ahead of print July 8]; Yee, Kevin W. H. et al., SU5416 and SU5614 inhibit kinase activity of wild-type and mutant FLT3 receptor tyrosine kinase. Blood, October 2002; 100 (8): 2941-2949; O'Farrell, Anne-Marie et al., SU11248 is a novel FLT3 tyrosine kinase inhibitor with potent activity in vitro and in vivo. Blood, May 2003; 101 (9): 3597-3605; Stone, R. M et al., PKC-412 FLT3 inhibitor therapy in AML: results of a phase II trials. Ann. Hematol. 2004; 83 Suppl 1: S89-90; and Murata, K. et al., Selective cytotoxic mechanism of GTP-14564, a novel tyrosine kinase inhibitor in leukemia cells expressing a constitutively active Fms-like tyrosine kinase 3 (FLT3). J Biol Chem. Aug. 29, 2003; 278 (35): 32892-32898 [Epub 2003 Jun. 18]; *Levis*, Mark et al., Small Molecule FLT3 Tyrosine Kinase Inhibitors. Current Pharmaceutical Design, 2004, 10, 1183-1193.

The aforementioned inhibitors have either been or are currently being investigated in the preclinical setting, or phase I and II trials as monotherapy in relapsed AML, or in phase III combination studies in relapsed AML. Despite reports of successful inhibition of FLT3 with these compounds in preclinical studies, complete remissions have rarely been achieved in FLT3 mutant AML patients in the clinical setting. For the majority of patients, the clinical response is short-lived. Response criteria for AML clinical trials are adapted from the International Working Group for AML. See Cheson et al. Revised Recommendations of the International Working Group for Diagnosis, Standardization of Response Criteria, Treatment Outcomes, and Reporting Standards for Therapeutic Trials in Acute Myeloid Leukemia. J Clin Oncol. 2003; 21:4642-4649. Responders are patients who obtain a Complete Response (CR), Complete Response with incomplete blood count recovery (CRi), or Partial Remission (PR). Briefly, criteria are as follows:

1. Complete Remission (CR):
   a. Peripheral blood counts:
      i. No circulating blasts
      ii. Neutrophil count≥$1.0\times10^9$/L
      iii. Platelet count >$100\times10^9$/L
   b. Bone marrow aspirate and biopsy:
      i. ≤5% blasts
      ii. No Auer Rods
      iii. No extramedullary leukemia
2. Complete remission with incomplete blood count recovery (CRi):
   a. Peripheral blood counts:
      i. No circulating blasts
      ii. Neutrophil count<$1.0\times10^9$/L, or
      iii. Platelet count<$100\times10^9$/L
   b. Bone marrow aspirate and biopsy
      i. ≤5% blasts
      ii. No Auer Rods
      iii. No extramedullary leukemia
3. Partial remission:
   a. All CR criteria if abnormal before treatment except:
   b. ≥50% reduction in bone marrow blast but still >5%

To date, clinical responses to FLT3 inhibitors have been primarily limited to clearance of peripheral blood (PB) blasts, which frequently return within a matter of weeks, while bone marrow (BM) blasts remain largely unaffected. For example, treatment with sorafenib, the prior mentioned multi-kinase inhibitor with activity against mutant FLT3, while effective in clearing PB blasts, has resulted in only modest BM blast reductions. See G Borthakur et al. Phase I study of sorafenib in patients with refractory or relapsed acute leukemias. Haematologica. January 2011; 96:62-8. Epub 2010 Oct. 15. BM blast percentage plays a central role in the diagnosis and classification of AML. The presence of a heightened percentage of blasts in BM is associated with significantly shorter overall survival. See Small D. FLT3 mutations: biology and treatment. Hematology Am Soc Hematol Educ Program. 2006:178-84; HM Amin et al. Having a higher blast percentage in circulation than bone marrow: clinical implications in myelodysplastic syndrome and acute lymphoid and myeloid leukemias. Leukemia. 2005; 19:1567-72. To effectively treat FLT3 mutated AML patients and overcome the significant unmet need in this patient population, an inhibitor is required that significantly depletes both PB and BM blasts, bridges high risk and heavily pretreated patients to stem cell transplant, and can help to decrease relapse rates and increase overall survival in early stage disease patients.

Independent of the patient's FLT3 status, genetic abnormalities—including recurrent mutations, chromosomal aneuploidies and structural abnormalities—have historically played a critical role in characterizing the leukemia, helping determine disease aggressiveness, response to treatment, and prognosis. In the following table, "favorable risk" disease is associated with long-term survival of up to 65%, "intermediate risk" disease is associated with long-term survival of about 25%, and "adverse risk" disease is associated with long-term survival of less than 10%. See Vander-Walde, A., "Genetics of Acute Myeloid Leukemia," available at http://emedicine.medscape.com/article/1936033-overview (last updated 1 Apr. 2016).

| Risk Group | Genetic Abnormality |
|---|---|
| Favorable Risk | t(8;21)(q22;q22.1); RUNX1-RUNXIT1 |
| | inv(16)(p13.1q22) or t(16;16)(p13.1;q22); CBFB-MYH11 |
| | Mutated NPM1 without FLT3-ITD or with FLT3-ITD$^{low}$ |
| | Biallelic mutated CEBPA |
| Intermediate Risk | Mutated NPM1 and FLT3-ITD$^{high}$ |
| | Wild-type NPM1 without FLT3-ITD or with FLT3-ITD$^{low}$ |
| | (without adverse-risk genetic lesions) |
| | t(9;11)(p21.3;q23.3); MLLT3-KMT2A |
| | Cytogenetic abnormalities not classified as favorable or adverse |
| Adverse Risk | t(6;9)(p23;q34.1); DEK-NUP214 |
| | t(v;11q23.3); KMT2A rearranged |
| | t(9;22)(q34.1;q11.2); BCR-ABL1 |
| | inv(3)(q21.3q26.2) or t(3;3)(q21.3;q26.2); GATA2, MECOM(EVI1) |
| | -5 or del(5q); -7; -17/abn(17p) |
| | Complex karyotype, monosomal karyotype |
| | Wild-type NPM1 and FLT3-ITD$^{high}$ |
| | Mutated RUNX1 |
| | Mutated ASXL1 |
| | Mutated TP53 |

See Döhner, H., et al. Diagnosis and management of AML in adults: 2017 ELN recommendations from an international expert panel. Blood. 2016; 129:424-447.

Additionally, in the context of AML, clinicians and researchers have recently begun a progressive shift away from a morphologic classification scheme to one informed by causative genomic changes. See Papaemmanuil, E., et al. Genomic Classification and Prognosis in Acute Myeloid Leukemia. N Engl J Med. 2016; 374:2209-2221. Notably, a recent analysis of 1540 AML patients revealed 5234 "driver mutations" (using widely accepted genetic criteria for cancer-associated genes) involving 76 genes or regions within those patients, with mutation frequencies consistent with those found in previous studies. These driver mutations included recurrent fusion genes, aneuploidies, and leukemia gene mutations (such as base substitutions and small (200-bp) insertions or deletions), all found to display an effect on individual patient prognosis. At least 1 driver mutation was identified in 96% of patient samples, with 2 or more driver mutations found in 86% of patient samples. This comprehensive analysis led to the identification of previously unidentified leukemia-associated genes, as well as complex co-mutation patterns within these patient samples, indicating a renewed need to evaluate the prognoses of prospective AML patients in light of a renewed genomic classification scheme. Eleven genomic subgroups were thus proposed in light of this comprehensive study.

Overall survival in these patient samples was correlated with the number of driver mutations, independent of age and cell count. Through a multivariate model designed to explore the relative contributions of genetic, clinical, and diagnostic variables to overall survival, genomic features were determined to be the most powerful predictor of overall patient survival.

This study thus demonstrated considerable differences in clinical presentation and overall survival among the identified genomic subgroups. This finding, together with the discovery that the prognostic effects of individual mutations were significantly altered by the presence or absence of other driving mutations, suggests the necessity of assessing a number of driving mutations present in AML patients to provide a more comprehensive individual patient prognosis.

Consequently, the presence or absence of other driver lesions, including gene mutations, chromosomal aneuploidies, fusion genes, and complex karyotypes, has been demonstrated to provide a more comprehensive analysis of patient prognosis than the patient's status in one driver mutation alone. In light of this background, the need for the development of therapies capable of overcoming these particularly grim patient prognoses takes on a renewed importance.

The current invention seeks to overcome disadvantages of the prior art.

SUMMARY OF THE INVENTION

In one embodiment, the present invention includes a method for treating a human patient with Crenolanib, wherein the human patient is suffering from a FLT3 mutated leukemia, the method comprising: determining that the human patient has a poor prognosis for the FLT3 mutated leukemia by: obtaining or having obtained a leukemia biological sample from the human patient; and performing or having performed a genotyping assay on the biological sample to determine that the human patient has both a mutated FLT3 or a constitutively active FLT3 mutant and one or more driver mutations in a nuclear transport protein that results in a loss of localization of the nuclear transport protein, wherein the presence of both the mutated FLT3 and the one or more driver mutations in nuclear transport proteins indicates that the patient has a poor prognosis; and administering to the patient determined to have the poor prognosis a therapeutically effective amount of Crenolanib or a pharmaceutically acceptable salt thereof, to treat the leukemia. In one aspect, the FLT3 mutation is selected from at least one of FLT3-ITD or FLT3-TKD. In another aspect, the nuclear transport protein is at least one of NPM1 or NUP98. In another aspect, the driver mutation in NPM1 is a frameshift mutation located at amino acid residues W288, W290, or R291. In another aspect, the driver mutation in NUP98 is a fusion comprising NUP98 and a transcription factor, topoisomerase, a protein with a HOX moiety, a protein with a PHD domain, a protein with a SET-binding domain, or DNA binding protein. In another aspect, the NUP98 fusion is selected from at least one of NUP98-ADD3, NUP98-ANKRD28, NUP98-BPTF, NUP98-CCD28A, NUP98-DDX10, NUP98-GSX2, NUP98-HHEX, NUP98-HMGB3, NUP98-HOXA9, NUP98-HOXA11, NUP98-HOXA13, NUP98-HOXC11, NUP98-HOXC13, NUP98-HOXD11, NUP98-HOXD13, NUP98-IQCG, NUP98-JADE2, NUP98-KAT7, NUP98, KDM5A, NUP98-LNP1, NUP98-KMT2A, NUP98-MLLT10, NUP98-NSD1, NUP98-NSD3, NUP98-PHF23, NUP98-PRRX1, NUP98-PRRX2, NUP98-POUIF1, NUP98-PSIP1, NUP98-RAD1GDS1, NUP98-RARA, NUP98-RARG, NUP98-SETBP1, NUP98-TOP1, NUP98-TOP2B, or NUP98-VRK1. In another aspect, the therapeutically effective amount of Crenolanib or the pharmaceutically acceptable salt thereof are from about 50 to 500 mg per day, 100 to 450 mg per day, 200 to 400 mg per day, 300 to 500 mg per day, 350 to 500 mg per day, or 400 to 500 mg per day; or the therapeutically effective amount of Crenolanib or the pharmaceutically acceptable salt thereof is administered at least one of continuously, intermittently, systemically, or locally; or the therapeutically effective amount of Crenolanib or the pharmaceutically acceptable salt thereof is administered orally, intravenously, or intraperitoneally. In another aspect, the Crenolanib or the pharmaceutically acceptable salt thereof is Crenolanib besylate, Crenolanib phosphate, Crenolanib lactate, Crenolanib hydrochloride, Crenolanib citrate, Crenolanib acetate, Crenolanib toluenesulphonate, and Crenolanib succinate. In another aspect, the method further comprises at least one of: administering up to three times or more a day for as long as the human patient is in need of treatment for the leukemia; or providing at least one of sequentially or concomitantly, with another pharmaceutical agent in a newly diagnosed human leukemia patient, to maintain remission of an existing human leukemia patient, or in a relapsed/refractory human leukemia patient; or providing as a single agent or in combination with another pharmaceutical agent in a patient with a newly diagnosed leukemia, to maintain remission, or in a relapse/refractory human leukemia patient; or providing as a single agent or in combination with another pharmaceutical agent in a newly diagnosed human pediatric leukemia patient, to maintain remission, or in a relapsed/refractory human pediatric leukemia patient. In another aspect, the human patient is relapsed/refractory to another tyrosine kinase inhibitor or chemotherapy.

In another embodiment, the present invention includes a method for treating a human patient suffering from a FLT3 mutated leukemia comprising: identifying that the FLT3 mutated leukemia is characterized as having a poor prognosis by: determining that the FLT3 mutated leukemia comprises both a deregulated FLT3 receptor tyrosine kinase and one or more driver mutations in a nuclear transport protein that results in a loss of localization of the nuclear transport protein from testing performed on a sample of the leukemia obtained from the human patient, and administering to the patient identified as having the FLT3 mutated leukemia a therapeutically effective amount of Crenolanib or a salt thereof sufficient to treat the leukemia with the deregulated FLT3 receptor tyrosine kinase and the driver mutation in the nuclear transport protein. In one aspect, the FLT3 mutation is selected from at least one of FLT3-ITD or FLT3-TKD. In another aspect, the nuclear transport protein is at least one of NPM1 or NUP98. In another aspect, the driver mutation in NPM1 is a frameshift mutation located at amino acid residues W288, W290, or R291 In another aspect, the driver mutation in NUP98 is a fusion comprising NUP98 and a transcription factor, topoisomerase, a protein with a HOX moiety, a protein with a PHD domain, a protein with a SET-binding domain, or DNA binding protein. In another aspect, the NUP98 fusion is selected from at least one of NUP98-ADD3, NUP98-ANKRD28, NUP98, BPTF, NUP98-CCD28A, NUP98-DDX10, NUP98-GSX2, NUP98-HHEX, NUP98-HMGB3, NUP98-HOXA9, NUP98-HOXA11, NUP98-HOXA13, NUP98-HOXC11, NUP98-HOXC13, NUP98-HOXD11, NUP98-HOXD13, NUP98-IQCG, NUP98-JADE2, NUP98-KAT7, NUP98, KDM5A, NUP98-LNP1, NUP98-KMT2A, NUP98-MLLT10, NUP98-NSD1, NUP98-NSD3, NUP98-PHF23, NUP98-PRRX1, NUP98-PRRX2, NUP98-POUIF1, NUP98-PSIP1, NUP98-RADIGDS1, NUP98-RARA, NUP98-RARG, NUP98-SETBP1, NUP98-TOP1, NUP98-TOP2B, or NUP98-VRK1. In another aspect, the therapeutically effective amount of Crenolanib or the pharmaceutically acceptable salt thereof is administered orally, intravenously, or intraperitoneally. In another aspect, the method further comprises at least one of: providing the Crenolanib as at least one of Crenolanib besylate, Crenolanib phosphate, Crenolanib lactate, Crenolanib hydrochloride, Crenolanib citrate, Crenolanib acetate, Crenolanib toluenesulphonate, and Crenolanib succinate; or providing at least one of sequentially or concomitantly, with a chemotherapeutic agent in a newly diagnosed leukemia, to maintain remission, or in a relapsed/refractory leukemia; or providing as a single agent or in combination with a chemotherapeutic agent for treatment of a human pediatric patient with leukemia; or providing at least one of sequentially or concomitantly to at least one of post standard induction therapy, or high dose induction therapy, in newly diagnosed leukemia; or providing as a single agent in treatment of patients with the leukemia that is either refractory to, or has relapsed after, prior treatment with a chemotherapeutic agent. In another aspect, the patient is refractory to at least one other tyrosine kinase inhibitor or a chemotherapy.

In another embodiment, the present invention includes a method for treating a human patient suffering from acute myelogenous leukemia (AML) comprising: obtaining a biological sample from the human patient; determining from the sample that the human patient has AML with a deregulated FLT3 receptor or a constitutively active FLT3 receptor; determining that the AML has one or more driver mutations in a nuclear transport protein that results in a loss of localization of the nuclear transport protein; and then administering to the human patient in need of such treatment for the AML comprising both the deregulated FLT3 receptor or a constitutively active FLT3 receptor and the one or more driver mutations in nuclear transport proteins a therapeutically effective amount of Crenolanib or salt thereof, thereby treating the AML. In one aspect, the FLT3 mutation is selected from at least one of FLT3-ITD or FLT3-TKD. In another aspect, the nuclear transport protein is at least one of NPM1 or NUP98. In another aspect, the mutation in NPM1 is a frameshift mutation located at amino acid residues W288, W290, or R291. In another aspect, the mutation in NUP98 is a fusion comprising NUP98 and a transcription factor, topoisomerase, a protein with a HOX moiety, a protein with a PHD domain, a protein with a SET-binding domain, or DNA binding protein. In another aspect, the NUP98 fusion is selected from at least one of NUP98-ADD3, NUP98-ANKRD28, NUP98, BPTF, NUP98-CCD28A, NUP98-DDX10, NUP98-GSX2, NUP98-HHEX, NUP98-HMGB3, NUP98-HOXA9, NUP98-HOXA11, NUP98-HOXA13, NUP98-HOXC11, NUP98-HOXC13, NUP98-HOXD11, NUP98-HOXD13, NUP98-IQCG, NUP98-JADE2, NUP98-KAT7, NUP98, KDM5A, NUP98-LNP1, NUP98-KMT2A, NUP98-MLLT10, NUP98-NSD1, NUP98-NSD3, NUP98-PHF23, NUP98-PRRX1, NUP98-PRRX2, NUP98-POUIF1, NUP98-PSIP1, NUP98-RADIGDS1, NUP98-RARA, NUP98-RARG, NUP98-SETBP1, NUP98-TOP1, NUP98-TOP2B, or NUP98-VRK1.

In another embodiment, the present invention includes a method for specifically inhibiting a deregulated or constitutively active FLT3 receptor tyrosine kinase, comprising: obtaining a sample from a human patient having acute myelogenous leukemia (AML); determining that the AML has a FLT3 receptor tyrosine kinase that is deregulated or constitutively active and one or more driver mutations in a nuclear transport protein that results in a loss of localization of the nuclear transport protein by performing or having performed genetic testing on the sample from the patient, wherein these mutations cause a poor prognosis; and administering a therapeutically effective amount of Crenolanib or a salt thereof, sufficient to eliminate the AML, to the human patient in need of such treatment for AML with both the deregulated or constitutively active FLT3 receptor tyrosine kinase and the one or more driver mutations in nuclear transport proteins. In one aspect, the deregulated FLT3 receptor is selected from at least one of FLT3-ITD or FLT3-TKD. In another aspect, the nuclear transport protein is at least one of NPM1 or NUP98. In another aspect, the mutation in NPM1 is a frameshift mutation located at amino acid residues W288, W290, or R291. In another aspect, the mutation in NUP98 is a fusion comprising NUP98 and a transcription factor, topoisomerase, a protein with a HOX moiety, a protein with a PHD domain, a protein with a SET-binding domain, or DNA binding protein. In another aspect, the NUP98 fusion is selected from at least one of NUP98-ADD3, NUP98-ANKRD28, NUP98, BPTF, NUP98-CCD28A, NUP98-DDX10, NUP98-GSX2, NUP98-HHEX, NUP98-HMGB3, NUP98-HOXA9, NUP98-HOXA11, NUP98-HOXA13, NUP98-HOXC11, NUP98-HOXC13, NUP98-HOXD11, NUP98-HOXD13, NUP98-IQCG, NUP98-JADE2, NUP98-KAT7, NUP98, KDM5A, NUP98-LNP1, NUP98-KMT2A, NUP98-MLLT10, NUP98-NSD1, NUP98-NSD3, NUP98-PHF23, NUP98-PRRX1, NUP98-PRRX2, NUP98-POUIF1, NUP98-PSIP1, NUP98-RADIGDS1, NUP98-RARA, NUP98-RARG, NUP98-SETBP1, NUP98-TOP1, NUP98-TOP2B, or NUP98-VRK1. In another aspect, the method further comprises at least one of: providing Crenolanib or the salt thereof in an amount that decreases the human patient's circulating peripheral blood blast count; or providing Crenolanib or the salt thereof in an amount that decreases the human patient's bone marrow blast count; or providing Crenolanib or the salt thereof in an amount from about 50 to 500 mg per day, 100 to 450 mg per day, 200 to 400 mg per day, 300 to 500 mg per day, 350 to 500 mg per day, or 400 to 500 mg per day; or providing Crenolanib or the salt thereof in an amount that is delivered at least one of continuously, intermittently, systemically, or locally. In another aspect, the therapeutically effective amount of Crenolanib or the salt thereof is administered orally, intravenously, or intraperitoneally. In another aspect, the Crenolanib or the salt thereof is at least one of Crenolanib besylate, Crenolanib phosphate, Crenolanib lactate, Crenolanib hydrochloride, Crenolanib citrate, Crenolanib acetate, Crenolanib toluenesulphonate, and Crenolanib succinate. In another aspect, the method further comprises at least one of: providing Crenolanib or the salt thereof up to three times or more a day for as long as the human patient is in need of treatment; or providing Crenolanib or the salt thereof at least one of sequentially or concomitantly, with another pharmaceutical agent in a newly diagnosed AML, to maintain remission, or in a relapsed/refractory AML; or providing Crenolanib or the salt thereof as a single agent or in combination with another pharmaceutical agent in a newly diagnosed AML, to maintain remission, or in a relapsed/refractor AML; or providing Crenolanib or the salt thereof as a single agent or in combination with another pharmaceutical agent in a newly diagnosed AML pediatric patient, to maintain remission, or in a relapsed/refractory AML pediatric patient. In another aspect, the patient is relapsed/refractory to a prior tyrosine kinase inhibitor.

This summary of the invention does not necessarily describe all necessary features of the invention.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The present invention comprises the use of the compounds of the present invention to treat disorders related to FLT3 kinase activity or expression in a subject.

Crenolanib (4-Piperidinamine, 1-[2-[5-[(3-methyl-3-oxetanyl) methoxy]-1H-benzimidazol-1-yl]-8-quinolinyl]) and its pharmaceutically acceptable salts, are protein tyrosine kinase inhibitors selective for constitutively active FLT3 mutations, including FLT3 ITD and FLT3 TKD mutations. Unlike prior FLT3 inhibitors in the art, the besylate salt form of Crenolanib has been shown to be remarkably effective in depleting circulating peripheral blood blast percentages and bone marrow blast percentages in heavily pretreated FLT3 mutant AML patients without significantly increasing patient QT prolongation. Crenolanib is currently being investigated for use in the treatment of patients with relapsed or refractory constitutively activated FLT3 mutated primary AML or AML secondary to myelodysplastic syndrome.

An analysis of Crenolanib's efficacy in patients presenting with concomitant FLT3 mutations, as well as other cytogenetic or molecular abnormalities, are also presently being developed through ongoing clinical trials.

Crenolanib safety and tolerability was evaluated between November 2003 and September 2006 in a phase I first-in-human dose-escalation single agent study in heavily pre-treated patients with advanced solid tumors (Protocol A5301001; See N Lewis et al., J Clin Oncol. 2009; 27: p5262-5269). Fifty-nine patients were enrolled and completed the study. Most treatment related adverse events were of grade 1 or 2 severity. There was no evidence of cumulative toxicity. In patients treated with lower drug dosages ranging from 60-200 mg once daily, the most common adverse events observed were grade 1 nausea and vomiting, which usually occurred approximately 45 minutes after dosing. There were no grade 3 or 4 toxicities in these patients. At higher doses 280 mg and 340 mg once daily, liver enzyme elevations were the most severe side effects. Liver enzyme levels returned to normal following the discontinuation of Crenolanib. The present invention has demonstrated that the administration of 100 mg three times daily of Crenolanib besylate to human patients diagnosed with constitutively activated FLT3 mutant relapsed or refractory AML does not always result in an elevation of liver enzymes. It also demonstrates that when liver enzymes are elevated that liver enzyme levels can be decreased by discontinuing the drug for approximately 1 week and re-starting Crenolanib at a reducing dosage of 80 mg three times daily.

No grade 2/3/4 QT prolongation was observed in any of the 59 patients treated in the phase I dose escalation safety study, despite Crenolanib dose received. Similarly, there have been no significant differences in baseline QT prolongation and on-treatment QT prolongation in a currently ongoing pediatric glioma trial with twenty-four children being treated with the besylate form of Crenolanib. Likewise, the present invention has shown no cases of QT prolongation following the administration of 100 mg of Crenolanib besylate three times daily to human patients diagnosed with constitutively activated FLT3 mutant relapsed or refractory AML. Other FLT3 inhibitors known in the art have caused significant QTc prolongation leading to strict clinical study inclusion and exclusion criteria to prevent severe adverse events. For example, two separate quizartinib AML studies have revealed that the compound causes significant Q prolongation. In a 76 patient phase I single agent study evaluating the compound in both FLT3 wildtype and FLT ITD mutated relapsed and refractory AML identified QT prolongation as the dose limiting toxicity. See J Cortes et al. AC220, a potent, selective, second generation FLT3 receptor tyrosine kinase (RTK) inhibitor, in a first-in-human (FIH) phase I AML study. Blood (ASH Annual Meeting Abstracts) 2009 November. Additionally, interim data from a phase II trial of quizartinib monotherapy in 62 patients with relapsed or refractory AML with FLT3 ITD activating mutations asymptomatic QT prolongation was one of the most common (>19%) drug related adverse events. QT prolongation of all grades occurred in 21 (34%) patients. More than half of the QT prolongation events recorded were grade 3 (18%). Reducing the starting dose of quizartinib by greater than 30% did not alleviate all cases of QT prolongation. See J Cortes et al. A phase II open-label, AC220 monotherapy efficacy study in patients with refractory/relapsed FLT3-ITD positive acute myeloid leukemia: updated interim results. Blood (ASH Annual Meeting Abstracts) 2011 December.

The present invention includes methods of treating proliferative disorders in a subject. In one embodiment, the present invention includes a method for treating a human patient having leukemia with Crenolanib, wherein the human patient is suffering from FLT3 mutated leukemia, the method comprising: determining whether the human patient has a poor prognosis for the FLT3 mutated leukemia by: obtaining or having obtained a leukemia sample from the human patient; and performing or having performed a genotyping assay on the biological sample to determine if the human patient has both a mutated FLT3 or a constitutively active FLT3 mutant and one or more loss of function mutations in NPM1, wherein the presence of both the mutated FLT3 and the one or more loss of function mutations in NPM1 indicates that the patient has a poor prognosis; and if the human patient has the poor prognosis administering to the patient a therapeutically effective amount of Crenolanib or a pharmaceutically acceptable salt thereof, to treat the leukemia. In another embodiment, the present invention includes a method for treating a human patient suffering from a leukemia comprising: identifying that the human patient is in need of therapy for the leukemia, wherein the leukemia comprises both a deregulated FLT3 receptor tyrosine kinase and a loss of function mutation in NPM1, and wherein the leukemia is characterized by having a poor prognosis; and administering to the patient a therapeutically effective amount of Crenolanib or a salt thereof sufficient to treat the leukemia. In another embodiment, the present invention includes a method for treating a human patient suffering from acute myelogenous leukemia (AML) comprising: obtaining a sample from the human patient; determining from the sample that the human patient has AML with a deregulated FLT3 receptor or a constitutively active FLT3 receptor; determining if the AML has one or more loss of function mutations in the NPM1 gene; and if the AML has both the deregulated FLT3 receptor or a constitutively active FLT3 receptor and the loss of function mutation in the NPM1 gene, then administering to the human patient in need of such treatment a therapeutically effective amount of Crenolanib or salt thereof. In another embodiment, the present invention includes a method for specifically inhibiting a deregulated or constitutively active FLT3 receptor tyrosine kinase, comprising: obtaining a sample from a human patient having acute myelogenous leukemia (AML); determining that the AML has a FLT3 receptor tyrosine kinase that is deregulate or constitutively active and one or more loss of function mutations in the NPM1 gene; wherein the AML with both the deregulated or constitutively active FLT3 receptor tyrosine kinase and the one or more loss of function mutations in the NPM1 gene cause a poor prognosis; and if the human patient has AML with both the deregulate or constitutively active FLT3 receptor tyrosine kinase and the one or more loss of function mutations in the NPM1 gene, administering to the human patient in need of such treatment a therapeutically effective amount of Crenolanib or a salt thereof, sufficient to eliminate the AML.

The present invention includes methods of treating proliferative disorders in a subject. In one embodiment, the present invention includes a method for treating a human patient having leukemia with Crenolanib, wherein the human patient is suffering from FLT3 mutated leukemia, the method comprising: determining whether the human patient has a poor prognosis for the FLT3 mutated leukemia by:

obtaining or having obtained a leukemia sample from the human patient; and performing or having performed a genotyping assay on the biological sample to determine if the human patient has both a mutated FLT3 or a constitutively active FLT3 mutant and one or more fusion mutations in NUP98, wherein the presence of both the mutated FLT3 and the one or more fusion mutations in NUP98 indicates that the patient has a poor prognosis; and if the human patient has the poor prognosis administering to the patient a therapeutically effective amount of Crenolanib or a pharmaceutically acceptable salt thereof, to treat the leukemia. In another embodiment, the present invention includes a method for treating a human patient suffering from a leukemia comprising: identifying that the human patient is in need of therapy for the leukemia, wherein the leukemia comprises both a deregulated FLT3 receptor tyrosine kinase and a fusion mutation in NUP98, and wherein the leukemia is characterized by having a poor prognosis; and administering to the patient a therapeutically effective amount of Crenolanib or a salt thereof sufficient to treat the leukemia. In another embodiment, the present invention includes a method for treating a human patient suffering from acute myelogenous leukemia (AML) comprising: obtaining a sample from the human patient; determining from the sample that the human patient has AML with a deregulated FLT3 receptor or a constitutively active FLT3 receptor; determining if the AML has one or more fusion mutations in the NUP98 gene; and if the AML has both the deregulated FLT3 receptor or a constitutively active FLT3 receptor and the fusion mutation in the NUP98 gene, then administering to the human patient in need of such treatment a therapeutically effective amount of Crenolanib or salt thereof. In another embodiment, the present invention includes a method for specifically inhibiting a deregulated or constitutively active FLT3 receptor tyrosine kinase, comprising: obtaining a sample from a human patient having acute myelogenous leukemia (AML); determining that the AML has a FLT3 receptor tyrosine kinase that is deregulate or constitutively active and one or more fusion mutations in the NUP98 gene; wherein the AML with both the deregulated or constitutively active FLT3 receptor tyrosine kinase and the one or more fusion mutations in the NUP98 gene cause a poor prognosis; and if the human patient has AML with both the deregulate or constitutively active FLT3 receptor tyrosine kinase and the one or more fusion mutations in the NUP98 gene, administering to the human patient in need of such treatment a therapeutically effective amount of Crenolanib or a salt thereof, sufficient to eliminate the AML.

The present inventor recognized that multiple studies have demonstrated that patients with both FLT3 and NPM1 mutations have worse outcomes than patients with NPM1 mutations alone. This is especially true for patients with high FLT3 burden, that is, the mutated FLT3 is present at an elevated level compared to wildype FLT3, typically defined as an allelic ratio of at least 0.5. See Dohner, H. et al . . . , "Diagnosis and Management of AML in Adults: 2017 ELN Recommendations from an International Expert Panel," Blood. Vol. 129, pp. 424-427 (26 Jan. 2017); Papaemmanuil, E., et al. Genomic Classification and Prognosis in Acute Myeloid Leukemia. N Engl J Med. 2016; 374:2209-2221; Patel, J. P et al. Prognostic Relevance of Integrated Genetic Profiling in Acute Myeloid Leukemia. N Engl J Med. Vol 366, No. 12, pp 1079-1089 (22 Mar. 2012). In contrast to FLT3, in which activating mutations are oncogenic, it is mutations in NPM1 which result in loss of normal localization which are associated with disease. NPM1, or nucelophosmin, is a nucleolar chaperone protein protein that exports proteins to and from the nucelus, acts as an inhibitor of centrosome duplication to protect cell division, cooperates in ribosome biogenesis, acts as a histone chaperone, and is involved in DNA repair through interactions with TP53. NPM1 functions as an oligomer (pentamer/decamer). Correct localizaiton of NPM1 within the cell, typically within the nucelolus, is vital for normal cell function. See Filini, B. et al., "NPM1-mutated Acute Myeloid Leukemia; from Bench to Bedside." Blood. Vol. 136, No. 15, pp. 1707-1721 (8 Oct. 2020). Mutations in the localization domain, which is located in exon 12 at the C-terminus between amino acid residues S243 and L294, result in innapropriate cytoplasmic localization and loss of normal function.

Frameshift mutations in the C-terminal localization domain represent the most common NPM1 mutations found in AML. Specifically, frameshift mutations at amino acid residues W288, W290 and R291 in exon 12. These mutations result in export of mutated NPM1 into the cytoplasm. However, other mutations within NPM1, such as mutations within exons 5, 9, and 11, also result in export and cytoplasmic localization. Such mutants are often referred to as NPMc+ or NPM1c to refer to their cytoplasmis localization. See Filini, B. et al., "NPM1-mutated Acute Myeloid Leukemia; from Bench to Bedside." Blood. Vol. 136, No. 15, pp. 1707-1721 (8 Oct. 2020). Table 1 below contains an analysis of the NPM1 mutations found by Papaemmanuil et al.

TABLE 1

| NPM1 Mutations by Type Identified by Papaemmanuil | | |
|---|---|---|
| Mutation Type | n | Percentage of NPM1 Mutations |
| W288fs | 435 | 98.9% |
| W290fs | 4 | 0.9% |
| R291fs | 1 | 0.2% |

The functional consequences of NPM1 mutations or loss have been extensively studied in animal models. Mice with NPM1 haploinsufficiency through loss of one allele or with conditional knock-in of an NPMlc mutant developed myeloproliferative disorders at high rates, with some mice progressing to AML with later onset. This is similar to human disease, which can progress from myeloproliferative disorders to AML over time. Mice engineered to carry both NPM1c mutations and activating FLT3 mutations develop rapid-onset AML at full penetrance. See Sportoletti, P. et al., "Mouse Models of NPM1-mutated Acute Myeloid Leukemia: Biological and Clinical Implications." Leukemia. Vol 29, No. 2, pp 269-278 (February 2015). These results in animal models show that NPM1 mutations and activating FLT3 mutations cooperate during leuekmogenesis and result in a poor prognosis.

The present inventor recognized that patients with both FLT3 and NUP98 mutations have worse outcomes than patients with either mutation alone. Patients with both FLT3 activating mutations and NUP98 fusion mutations display rates of relapse and of death twice the level of patients without these mutations, with half of patients expected to die within 10 months. See Bisio, V. et al., "NUP98-fusion Transcripts Characterize Different Biological Entities Within Acute Myeloid Leukemia." Leukemia. Vol 31, No. 4, pp 974-977 (April 2017). In contrast to FLT3, in which activating mutations are oncogenic, it is fusion mutations resulting in loss of normal localization of NUP98 that are associated with disease. Similarly to NPM1, NUP98, or nucleoporin 98, encodes a protein involved in nuclear transport. NUP98 is a part of the of the nuclear pore complex, responsible for the transport of macromolecules to and from the nucleus. Due to this function, the proper localization of NUP98 plays an important role in its normal function, just as with NPM1. This localization is dependent on autoproteolytic cleavage at sites in the N- and C-terminal domains. See Michmerhuizen, N. L., et al., "Mechanistic Insights and Potential Therapeutic Approaches for NUP98-Rearranged Hematologic Malignancies." Blood. Vol 136, No. 20, pp 2275-2289 (12 Nov. 2020).

Fusion proteins between the N-terminus of NUP98 and a variety of fusion partners, including homeodomain (HOX) partners such as HOXA9, PRRX2, or non-HOX fusion partners, result in inappropraite localization of NUP98, as the localization domains in the C-terminus are lost. Wildtype NUP98 is located at nuclear pore complexes in the nucelar membrane, NUP98 fusions have been shown to locate to nuclear puncta, that is, membraneless bodies of protein localization within the nucleus, rather than at the membrane. The majority of identified NUP98 fusion partners are DNA binding proteins such as: transcription factors, including HOX domain containing partners partners; topoisomerases; or other proteins with DNA binding domains such as PHD (plant homeodomain) fingers which bind to histone H3, or SET domains which have methyltransferase activity, and others. Notably, many NUP98 fusion mutations are cryptic, that is, they are not measurable using standard cytogenetic analysis, but are discovered upon genetic sequencing. See Michmerhuizen, N. L., et al., "Mechanistic Insights and Potential Therapeutic Approaches for NUP98-Rearranged Hematologic Malignancies." Blood. Vol 136, No. 20, pp 2275-2289 (12 Nov. 2020). These partners enable binding of the NUP98 fusion to co-activators and other cofactors to deregulate transcription and drive oncogenesis. Table 2 below contains the various fusion partners of NUP98 identified in hematological malignancies and reviewed by Michmerhuizen et al.

TABLE 2

NUP98 Fusions Identified in Hematological Malignancies

| Fusion Partner | Transcription-Related Domain/Function | Disease |
| --- | --- | --- |
| ADD3 | None Identified | AML, T-ALL |
| ANKRD28 | None Identified | MDS, AML |
| BPTF | PHD Domain | T-ALL, AML |
| CCD28A | None Identified | AML, T-ALL |
| DDX10 | RNA Helicase | MDS, AML, CML, CMML |
| GSX2 | HOX | AML |
| HHEX | HOX | AML |
| HMGB3 | Nucleosome Remodeling | AML |
| HOXA9 | HOX | MDS, AML, CML, CMML |
| HOXA11 | HOX | CML, JMML |
| HOXA13 | HOX | MDS, AML, CML, CMML |
| HOXC11 | HOX | AML |
| HOXC13 | HOX | AML |
| HOXD11 | HOX | AML |
| HOXD13 | HOX | AML, CML |
| IQCG | None Identified | MPAL |
| JADE2 | PHD Domain | JMML |
| KAT7 | HAT | CMML |
| KDM5A | PHD Domain | AML |
| LNP1 | None Identified | AML |
| KMT2A | Methyltransferase | AML |
| MLLT10 | OM-LZ domain | MDS |
| NSD1 | SET and PHD Domains | MDS, AML, MPAL |
| NSD3 | SET and PHD Domains | MDS, AML |
| PHF23 | PHD Domain | AML |
| PRRX1 | HOX | AML, CML, MDS |

TABLE 2-continued

NUP98 Fusions Identified in Hematological Malignancies

| Fusion Partner | Transcription-Related Domain/Function | Disease |
| --- | --- | --- |
| PRRX2 | HOX | AML |
| POU1F1 | HOX | AML |
| PSIP1 | Transcriptional Coactivator | AML, CML, MDS |
| RAP1GDS1 | None Identified | T-ALL, AML |
| RARA | DNA-binding Domain | AML |
| RARG | DNA-binding Domain | AML |
| SETBP1 | SET Domain | T-ALL |
| TOP1 | Topoisomerase | MDS, AML |
| TOP2B | Topoisomerase | AML |
| VRK1 | None Identified | T-ALL |

The functional consequences of NUP98 fusion mutations have been extensively studied in mouse models. Transplantation of bone marrow progenitor cells expressing the NUP98-NSD1 fusion mutant and FLT3-ITD (through retroviral expression) into mice results in AML in 100% of mice within 12 to 91 days, dependent on the level of FLT3-ITD expression (high expression associated with shorter latency). See Thanasopoulou A., et al., "Potent Co-operation between the NUP98-NSD1 Fusion and the FLT3-ITD Mutation in Acute Myeloid Leukemia Induction." Haematologica. Vol 99, No. 9, pp. 1465-1471 (22 Jun. 2014). Genetically engineered mice expressing the NUP98-HOXD13 fusion and FLT3-ITD develop mice with 100% penetrance and a short latency (mean 30 days), with a mean survival of just 95 days. See Greenblatt, S., et al., "Knock-in of a FLT3-ITD Mutation Cooperates with a NUP98-HOXD13 Fusion to Generate Acute Myeloid Leukemia in a Mouse model." Blood. Vol., 119, No. 12, pp. 2883-2894 (22 Mar. 2012). These results in animal models show that NUP98 fusion proteins and activating FLT3 mutations together result in a highly aggressive AML associated with an extremely poor prognosis and low survival.

As used herein, the term "poor prognosis" refers to a decreased chance of survival (for example, decreased overall survival, relapse-free survival, or metastasis-free survival). For example, a poor prognosis has a decreased chance of survival includes a survival time of equal to or less than 60 months, such as 50 months, 40 months, 30 months, 20 months, 12 months, 6 months, or 3 months from time of diagnosis or first treatment or remission.

By contrast, a "good prognosis" refers to an increased chance of survival, for example increased overall survival, relapse-free survival, or metastasis-free survival. For example, a good prognosis has an increased chance of survival includes a survival time of at least 60 months from time of diagnosis, such as 60 months, 80 months, 100 months, 120 months, 150 months, or more from time of diagnosis or first treatment.

Detection of the mutated FLT3 and/or one or more genetic abnormalities can be performed using any suitable means known in the art. For example, detection of gene mutations can be accomplished by detecting nucleic acid molecules (such as DNA) using nucleic acid amplification methods (such as RT-PCR) or high-throughput sequencing (i.e. "next-generation sequencing"). Detection of chromosomal abnormalities can also be accomplished using karyotyping or in situ hybridization that detect structural and numerical alterations.

In mutated FLT3 tumors, the alteration in expression or presence of one or more genetic abnormalities, such as, e.g., chromosomal translocations, deletions, alternative gene splicing, mutations or deletions within coding or intron-exon boundary regions, can be lead to a measurable decrease in prognosis. In addition to a pre-existing FLT3 mutation, the additional genetic abnormalities disclosed herein significantly decrease the prognosis of the patient. A poor prognosis can refer to any negative clinical outcome, such as, but not limited to, a decrease in likelihood of survival (such as overall survival, relapse-free survival, or metastasis-free survival), a decrease in the time of survival (e.g., less than 5 years, or less than one year), presence of a malignant tumor, an increase in the severity of disease, a decrease in response to therapy, an increase in tumor recurrence, an increase in metastasis, or the like. In particular examples, a poor prognosis is a decreased chance of survival (for example, a survival time of equal to or less than 60 months, such as 50 months, 40 months, 30 months, 20 months, 12 months, 6 months or 3 months from time of diagnosis or first treatment).

In other embodiments of the method, the presence of the one or more loss of function mutations in NPM1 or fusion mutations in NUP98 (in addition to the FLT3 mutation) in the tumor sample relative to a control indicates a poor prognosis for the patient with the tumor. The method includes detecting the presence of one or more loss of function mutations in NPM1 or fusion mutations in NUP98, using genetic sequencing techniques known in the art to determine if a sample has one of the specified NPM1 or NUP98 mutations.

As used herein, the phrases "mutations responsible for cancer" and "driver mutations" are used interchangeably to refer to mutations that are present in cancer tissues and which are capable of inducing carcinogenesis of cells. Generally, if a mutation is found in a cancer tissue in which no other known oncogene mutations exists (in other words, if a mutation exists in a mutually exclusive manner with known oncogene mutations), then the mutation can be determined to be a responsible mutation for cancer, and thus, a "driver mutation". Driver mutations within NPM1 include loss of function mutations resulting from nonsense or frameshift mutations within localization signals, including those in exons 5, 9, 11, or 12. Driver mutations within NUP98 include fusion mutations with any of the fusion partners listed in Table 2, or others.

In one embodiment, the present invention provides a method for reducing or inhibiting the kinase activity of FLT3 in a subject comprising the step of administering a compound of the present invention to the subject.

As used herein, the term "subject" or "patient" are used interchangeable to refer to an animal, such as a mammal or a human, who has been the object of medical treatment, observation or experiment.

In one embodiment to this aspect, the present invention provides a method for reducing or inhibiting the kinase activity of FLT3 in a subject comprising the step of administering a compound of the present invention to the subject.

The term "subject" refers to an animal, such as a mammal or a human, who has been the object of treatment, observation or experiment.

In other embodiments to this aspect, the present invention provides therapeutic methods for treating a subject with a cell proliferative disorder driven by aberrant kinase activity of mutant FLT3. In one example, the invention provides methods for treating a cell proliferative disorder related to mutant FLT3, comprising administration of a therapeutically effective amount of a pharmaceutical composition comprising a compound of the present invention in a subject. Administration of said therapeutic agent can occur upon manifestation of symptoms characteristic of the FLT3 driven cell proliferative disorder, such that a disease or disorder treated.

The term "therapeutically effective amount" as used herein, refers to an amount of active compound or pharmaceutical salt that elicits the biological or medicinal response in a subject that is being sought by a researcher, veterinarian, medical doctor or other clinician, which includes alleviation of the symptoms of the disease or disorder being treated.

Methods for determining therapeutically effective doses for pharmaceutical compositions comprising a compound of the present invention are known in the art.

As used herein, the term "composition" is intended to encompass a product comprising the specified ingredients in the specified amounts, as well as any product which results, directly or indirectly, from combinations of the specified ingredients in the specified amounts.

As used herein, the terms "disorder related to FLT3," or "disorders related to FLT3 receptor," or "disorders related to FLT3 receptor tyrosine kinase," or "FLT3 driven cell proliferative disorder" includes diseases associated with or implicating FLT3 activity, for example, mutations leading to constitutive activation of FLT3. Examples of "disorders related to FLT3" include disorders resulting from over stimulation of FLT3 due to mutations in FLT3, or disorders resulting from abnormally high amount of FLT3 activity due to abnormally high amount of mutations in FLT3. It is known that over-activity of FLT3 has been implicated in the pathogenesis of many diseases, including the following listed cell proliferative disorders, neoplastic disorders and cancers.

The term "cell proliferative disorders" refers to excess cell proliferation of one or more subset of cells in a multicellular organism resulting in harm (i.e. discomfort or decreased life expectancy) to the multicellular organism. Cell proliferative disorders can occur in different types of animals and humans. As used herein, "cell proliferative disorders" include neoplastic disorders.

The term "neoplastic disorder' as used herein, refers to a tumor resulting from abnormal or uncontrolled cellular growth. Examples of neoplastic disorders include, but are not limited to the following disorders, for instance: the myeloproliferative disorders, such as thrombocytopenia, essential thrombocytosis (ET), agnogenic myeloid metaplasia, myelofibrosis (MF), myelofibrosis with myeloid metaplasia (MMM), chronic idiopathic myelofibrosis (UIMF), and polycythemia vera (PV), the cytopenias, and pre-malignant myelodysplastic syndromes; cancers such as glioma cancers, lung cancers, breast cancers, colorectal cancers, prostate cancers, gastric cancers, esophageal cancers, colon cancers, pancreatic cancers, ovarian cancers, and hematological malignancies, including myelodysplasia, multiple myeloma, leukemias, and lymphomas. Examples of hematological malignancies include, for instance, leukemias, lymphomas, Hodgkin's disease, and myeloma. Also, acute lymphocytic leukemia (ALL), acute myeloid leukemia (AML), acute promyelocytic leukemia (APL), chronic lymphocytic leukemia (CLL), chronic myeloid leukemia (CML), chronic neutrophilic leukemia (CNL), acute undifferentiated leukemia (AUL), anaplastic large-cell lymphoma (ALCL), prolymphocytic leukemia (PML), juvenile myelomonocytic leukemia (JMML), adult T-cell ALL, AML, with trilineage myelodysplasia (AMLITMDS), mixed lineage leukemia (MLL), myelodysplastic syndromes (MDSs), myeloproliferative disorders (MPD), and multiple myeloma (MM).

The expression of mutated FLT3, constitutively active FLT3 mutant, and the one or more mutations in NPM1 or NUP98, can be determined using standard molecular biology techniques, including sequencing at the RNA or DNA level, protein expression, protein function, the presence or absence of the RNA, DNA, and/or protein, as will be known to those of skill in the art following the teachings of, e.g., standard techniques for sequencing (including Next Generation Sequencing (NGS)), cloning, RNA and DNA isolation, amplification and purification, detection and identification of chromosomal abnormalities, and various separation techniques are those known and commonly employed by those skilled in the art. A number of standard techniques are described in Sambrook et al. (1989) Molecular Cloning, Second Edition, Cold Spring Harbor Laboratory, Plainview, N.Y.; Maniatis et al. (1982) Molecular Cloning, Cold Spring Harbor Laboratory, Plainview, N.Y.; Wu (ed.) (1993) Meth. Enzymol. 218, Part I; Wu (ed.) (1979) Meth. Enzymol. 68; Wu et al. (eds.) (1983) Meth. Enzymol. 100 and 101; Grossman and Moldave (eds.) Meth. Enzymol. 65; Miller (ed.) (1972) Experiments in Molecular Genetics, Cold Spring Harbor Laboratory, Cold Spring Harbor, N.Y.; Old and Primrose (1981) Principles of Gene Manipulation, University of California Press, Berkeley; Schleif and Wensink (1982) Practical Methods in Molecular Biology; Glover (ed.) (1985) DNA Cloning Vol. I and II, IRL Press, Oxford, UK; Hames and Higgins (eds.) (1985) Nucleic Acid Hybridization, IRL Press, Oxford, UK; Setlow and Hollaender (1979) Genetic Engineering: Principles and Methods, Vols. 1-4, Plenum Press, New York; Fitchen, et al. (1993) Annu Rev. Microbiol. 47:739-764; Tolstoshev, et al. (1993) in Genomic Research in Molecular Medicine and Virology, Academic Press; and Ausubel et al. (1992) Current Protocols in Molecular Biology, Greene/Wiley, New York, N.Y. Abbreviations and nomenclature, where employed, are deemed standard in the field and commonly used in professional journals such as those cited herein. The above techniques can be used to detect genetic abnormalities such as aneuploidy, monosomy, trisomy, or polysomy; chromosomal aberrations such as one or more deletions, duplications, translocations, inversions, insertions, rings, or isochromosomes. Additional genetic abnormalities include driver mutations such as those selected from mutations in NPM1 or NUP98, human or animal, with the names available from Genecards.com, with current accession numbers, sequences, and probes to the same incorporated herein by reference.

For example, detection of gene mutations can be accomplished by detecting nucleic acid molecules (such as DNA) using nucleic acid amplification methods (such as RT-PCR) or high throughput sequencing (i.e., "next-generation sequencing"). By example, next-generation sequencing platforms such as Illumina may be used to determine the exact genetic sequence of specific genes, or portions of genes, of interest. In brief, DNA from a tumor sample is fragmented, ligated with the appropriate primers and adaptors, and amplified using PCR during "library preparation". The prepared libraries are then sequenced using one of a number of commercially available systems which generates the sequence of the chosen target genes, all exomes, or the entire genome. The sequences are then analyzed using commercially available software, which aligns the tumor sample sequence to the known sequence of the genes of interest and performs a variant calling step, which identifies differences at the DNA level in the tumor sample and determines if such mutations would result in alteration of the amino acid sequence in the translated protein. Using these systems, a person of skill in the art can determine if a subject has one of the identified mutations with in FLT3. Further information on FLT3, including full gene and protein sequences, known clinically relevant variants and mutations, tissue expression, and signaling interaction partners can be found at UniProt (accession number P36888-1), GenBank (accession number NM_04119.2), and GenPept (accession number NP_004110.2).

The types of driver mutations in the NPM1 and NUP98 genes include frameshift, nonsense, or fusion mutations which result in inappropriate localization of the protein. The specific driver mutations include nonsense or frameshift mutations in exons 5, 9, 11, or 12 of NPM1, and fusion mutations in NUP98. The presence of one or more of these mutations can be determined using standard molecular biology techniques, including Next Generation Sequencing, or PCR based tests in the case of NPM1 exon 12 frameshift mutations. Standard analysis methods, including variant calling and such analyses as SIFT (Sorting Intolerant from Tolerant) and PolyPhen (Polymorphism Phenotyping), may be used to determine if a particular variant found in a tumor sample is detrimental to normal protein function. Gene mutation panels such as those used by medical professionals during diagnostic workup of potential proliferative disease patients may also be used. Further information on NPM1, including full gene and protein reference sequences and known clinically relevant variants and mutations can be found at UniProt (accession number P06748-1), Gen Bank (accession number NM_002520.6), and GenPept (accession number NP_002511.1). Further information on NUP98, including full gene and protein reference sequences and known clinically relevant variants and mutations can be found at UniProt (accession number P52948-1), Gen Bank (accession number NM_001365126.2), and GenPept (accession number NP_001352055.1).

In a further embodiment, the present invention can be combined with another therapy as a combination therapy for treating or inhibiting the onset of a cell proliferative disorder related to FLT3 in a subject. The combination therapy comprises the administration of a therapeutically effective amount of a compound of the present invention and one or more other anti-cell proliferation therapies including, but not limited to, chemotherapy and radiation therapy.

In an embodiment of the present invention, a compound of the present invention may be administered in combination with chemotherapy. Used herein, chemotherapy refers to a therapy involving a chemotherapeutic agent. A variety of chemotherapeutic agents may be used in combination with the present invention. By way of example only, taxane compounds, specifically docetaxel, is safely administered in combination with a compound of the present invention in a dosage of 75 mg per square meter (mg/m2) of body surface area.

Chemotherapy is known to those skilled in the art. The appropriate dosage and scheme for chemotherapy will be similar to those already employed in clinical therapies wherein the chemotherapy is delivered in combination with other therapies or used alone.

In another embodiment of the present invention, compounds of the present invention may be administered in combination with radiation therapy. Used herein, "radiation therapy" refers to a therapy that comprises the exposure of a subject in need to radiation. Radiation therapy is known to those skilled in the art. The appropriate dosage and scheme for radiation therapy will be similar to those already employed in clinical therapies wherein the radiation therapy is delivered in combination with other therapies or used alone.

In another embodiment of the present invention, the compounds of the present invention may be administered in combination with a targeted therapy. As used herein, "targeted therapy" refers to a therapy targeting a particular class of proteins involved in tumor development or oncogenic signaling. For example, tyrosine kinase inhibitors against vascular endothelial growth factor have been used in treating cancers.

The present invention also includes methods that include the use of a second pharmaceutical agent in addition to compounds of the present invention, the two may be administered simultaneously or sequentially (in either order).

In one embodiment, the present invention therapeutically effective amounts of the compound having formula I:

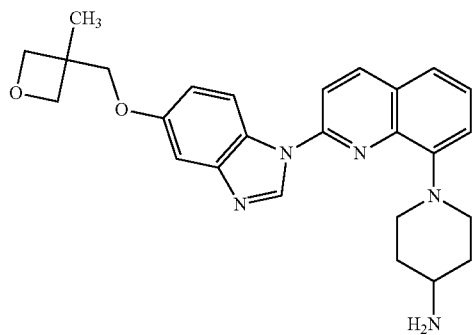 [SMILES: CC1(COc2ccc3c(c2)ncn3-c2ccc3cccc(N4CCC(N)CC4)c3n2)COC1]

or a pharmaceutically acceptable salt or solvate thereof, in a therapeutically or prophylactically effective amount against a proliferative disease is selected from at least one of a leukemia, myeloma, myeloproliferative disease, myelodysplastic syndrome, idiopathic hyperesinophilic syndrome (HES), bladder cancer, breast cancer, cervical cancer, CNS cancer, colon cancer, esophageal cancer, head and neck cancer, liver cancer, lung cancer, nasopharyngeal cancer, neuroendocrine cancer, ovarian cancer, pancreatic cancer, prostate cancer, renal cancer, salivary gland cancer, small cell lung cancer, skin cancer, stomach cancer, testicular cancer, thyroid cancer, uterine cancer, and hematologic malignancy. Pharmaceutically acceptable salts including hydrochloride, phosphate and lactate are prepared in a manner similar to the benzenesulfonate salt and are well known to those of moderate skill in the art.

Compounds of the present invention may be administered to a subject systemically, for example, orally, intravenously, subcutaneously, intramuscular, intradermal or parenterally. The compounds of the present invention can also be administered to a subject locally.

Compounds of the present invention may be formulated for slow-release or fast-release with the objective of maintaining contact of compounds of the present invention with targeted tissues for a desired range of time.

Compositions suitable for oral administration include solid forms, such as pills, tablets, caplets, capsules, granules, and powders, liquid forms, such as solutions, emulsions, and suspensions. Forms useful for parenteral administration include sterile solutions, emulsions and suspensions.

The daily dosage of the compounds of the present invention may be varied over a wide range from 50 to 500 mg per adult human per day. For oral administration, the compositions are preferably provided in the form of tablets containing 20 and 100 milligrams. The compounds of the present invention may be administered on a regimen up to three times or more per day. Preferably three times per day. Optimal doses to be administered may be determined by those skilled in the art, and will vary with the compound of the present invention used, the mode of administration, the time of administration, the strength of the preparation, the details of the disease condition. Factors associated with patient characteristics, such as age, weight, and diet will call for dosage adjustments.

Preparation of the compounds of the present invention. General synthetic methods which may be referred to for preparing the compounds of formula I are provided in U.S. Pat. No. 5,990,146 (issued Nov. 23, 1999) (Warner-Lambert Co.) and PCT published application numbers WO 99/16755 (published Apr. 8, 1999) (Merck & Co.) WO 01/40217 (published Jul. 7, 2001) (Pfizer, Inc.), US Patent Application No. US 2005/0124599 (Pfizer, Inc.) and U.S. Pat. No. 7,183,414 (Pfizer, Inc.), relevant portions incorporated herein by reference.

Pharmaceutically acceptable salts such as hydrochloride, phosphate and lactate are prepared in a manner similar to the benzenesulfonate salt and are well known to those of moderate skill in the art. The following representative compounds of the present invention are for exemplary purposes only and are in no way meant to limit the invention, including Crenolanib as Crenolanib Besylate, Crenolanib Phosphate, Crenolanib Lactate, Crenolanib Hydrochloride, Crenolanib Citrate, Crenolanib Acetate, Crenolanib Toluenesulphonate and Crenolanib Succinate.

SUMMARY OF EXAMPLES

Example A: The leukemic blasts from a newly diagnosed patient harbored in addition to FLT3-ITD and TKD mutations, a IDH2 R140Q mutation, a SRSF2 P95L mutation, and a NPM1 W288fs10+ mutation. The patient achieve reduction in bone marrow blasts to less than 5% following induction chemotherapy followed by sequential administration of Crenolanib besylate.

Example B: The leukemic blasts from a newly diagnosed patient harbored in addition to a FLT3-ITD mutation, a WT1 frameshift mutation at amino acid residue R380, a ETV6 mutation at H400, a RUNX1 frameshift mutation at amino acid residue V101, and a NUP98-PRRX2 fusion. The patient achieved reduction in bone marrow blasts to less than 5% following induction chemotherapy followed by sequential administration of Crenolanib besylate.

Example C: The leukemic blasts from a newly diagnosed patient harbored in addition to a FLT3-ITD mutation an IDH1 R140Q mutation, and a NPM1 frameshift mutation at amino acid residue W288. The patient achieved reduction in bone marrow blasts to less than 5% following induction chemotherapy followed by sequential administration of Crenolanib besylate.

Example D: The leukemic blasts from a newly diagnosed patient harbored in addition to a FLT3-TKD mutation, a NPM1 frameshift mutation at amino acid residue W288, and a JAK2 W1113C mutation. The patient achieved reduction in bone marrow blasts to less than 5% following induction chemotherapy followed by sequential administration of Crenolanib besylate.

Example E: The leukemic blasts from a newly diagnosed patient harbored in addition to a FLT3-ITD mutation, a NPM1 frameshift mutation at amino acid residue 290, a WT1 frameshift mutation at amino acid residue A314, and a complex karyotype. The patient achieved reduction in bone marrow blasts to less than 5% following induction chemotherapy followed by sequential administration of Crenolanib besylate.

Example F: The leukemic blasts from a newly diagnosed patient harbored in addition to FLT3-ITD and FLT3-TKD mutations, a CEBPA frameshift mutation at amino acid reside P39, a NPM1 frameshift mutation at amino acid residue W288, a KRAS G12D mutation, and a NRAS G13V mutation. The patient achieved reduction in bone marrow blasts to less than 5% following induction chemotherapy followed by sequential administration of Crenolanib besylate.

Example G: The leukemic blasts from a newly diagnosed patient harbored in addition to a FLT3-ITD mutation, a NPM1 frameshift mutation at amino acid residue W288, and a TET2 frameshift mutation at amino acid residue T606, and the cytogenetic abnormality trisomy 4. The patient achieved reduction in bone marrow blasts to less than 5% following induction chemotherapy followed by sequential administration of Crenolanib besylate.

Example H: The leukemic blasts from a relapsed/refractory patient harbored in addition to a FLT3-ITD mutation, a IDH1 R132H mutation, a NPM1 frameshift mutation at amino acid residue W288, a TET2 frameshift mutation at amino acid residue N275, and an ASXL1 A1312V mutation. The patient achieved reduction in bone marrow blasts to less than 5% following salvage chemotherapy followed by sequential administration of Crenolanib besylate.

Example I: The leukemic blasts from a relapsed/refractory patient harbored in addition to a FLT3-ITD mutation, a NPM1 frameshift mutation at amino acid residue W288. The patient achieved reduction in bone marrow blasts to less than 5% following administration of Crenolanib besylate.

Example J: The leukemic blasts from a relapsed/refractory patient harbored in addition to a FLT3-TKD mutation, a NPM1 frameshift mutation at amino acid residue W288, a CEBPA frameshift mutation at amino acid residue H56, and a WT1 M250K mutation and a translocation between chromosomes 3 and 16. The patient achieved reduction in bone marrow blasts to less than 5% following administration of Crenolanib besylate.

Example A: The effect of Crenolanib besylate therapy in a newly diagnosed AML patient with FLT3-ITD, FLT3-TKD, IDH2, SRSF2, and NPM1 mutations: achievement of reduction in bone marrow blasts to less than 5% with hematologic recovery. A 54-year-old female was diagnosed with AML positive for both FLT3-ITD and FLT3-TKD mutations. The patient's leukemic blasts also had mutations in the IDH2, SRSF2, and NPM1 genes. Specifically, the patient had an IDH2 R140Q missense mutation, a SRSF2 P95L, and a NPM1 frameshift mutation at amino acid residue W288. As these mutations are characterized as independent driver mutations, and are associated with a particularly poor prognosis, the patient's presentation of these co-occurring mutations placed her in a significantly high-risk group for AML patients, associated with poor response rates, increased cumulative incidence of relapse, and shortened survival. Half of patients with FLT3-ITD and IDH1 co-occurring mutations are expected to die within 1.5 years of diagnosis. See Boddu, P. et al., "Influence of IDH on FLT3-ITD Status in Newly Diagnosed AML." Leukemia. Vol. 31, No. 11, pp. 2526-2529 (29 Jul. 2017) Half of patients with SRSF2 mutations are expected to die within 1.2 years. See Hou, H. A. et al., "Splicing Factor Mutations Predict Poor Prognosis in Patients with De Novo Acute Myeloid Leukemia." Oncotarget. Vol. 7, No. 8, pp. 9084-101 (23 Feb. 2016) While NPM1 mutations alone are a favorable prognostic factor according to ELN guidelines, when present in combination with FLT3-ITD mutations, it is a poor prognostic marker. See Dohner, H. et al., "Diagnosis and Management of AML in Adults: 2017 ELN recommendations from an international expert panel." Blood. Vol. 129, No. 4, pp. 424-447 (26 Jan. 2017).

At diagnosis, the patient was found to have 95% bone marrow blasts. Following diagnosis, the patient was provided with oral Crenolanib besylate on a clinical trial for newly diagnosed AML patients (NCT02283177). The patient was initially treated with induction chemotherapy, comprised of seven days of cytarabine and three days of idarubicin. The patient began therapy with 100 mg of Crenolanib besylate three times daily on day 12.

A bone marrow biopsy taken on day 14 of the clinical trial revealed the patient's bone marrow blasts had reduced to less than 5%, classified as a complete remission. An additional bone marrow biopsy taken on day 27 of induction treatment confirmed complete remission. The patient remains alive and free of disease more than 5 years after start of therapy, significantly longer than the expected median survival for patients with these co-occurring mutations.

Table 3 below illustrates the ability of Crenolanib to clear and maintain clearance of malignant leukemia in the bone marrow of Example A, a newly diagnosed AML patient with FLT3-ITD, FLT3-TKD, IDH1, SRSF2, and NPM1 mutations after treatment with chemotherapy and Crenolanib besylate.

TABLE 3

Ability of Crenolanib to clear and maintain clearance of malignant leukemia in the bone marrow.

| Days on Clinical Trial | Bone Marrow Blast (%) |
| --- | --- |
| 0 | 95% |
| 14 | <5% |
| 27 | <5% |
| 147 | <5% |
| 217 | <5% |

Example B: Effect of Crenolanib Besylate Therapy in a Newly Diagnosed AML Patient with FLT3-ITD, WT1, ETV6, and RUNX1 mutations and a NUP98-PRRX2 fusion mutation: achievement of reduction in bone marrow blasts to less than 5% with hematologic recovery.

A 66-year-old female was diagnosed with AML positive for a FLT3-ITD mutation. The patient's leukemic blasts also carried mutations in the WT1, ETV6, and RUNX1 genes, as well as fusion gene between NUP98 and PRRX2. Specifically, the patient had a WT1 frameshift mutation at amino acid residue R380, a ETV6 mutation at H400, a RUNX1 frameshift mutation at amino acid residue V101, and a NUP98-PRRX2 fusion. As these mutations are characterized as independent driver mutations, and are each associated with a particularly poor prognosis, the patient's presentation of these mutations placed her in a significantly high-risk group for AML patients, associated with poor response rates, increased cumulative incidence of relapse, and shortened survival. Half of patients with WT1 mutations are expected to die within 1 year of diagnosis, with less than 15% of patients expected to survive more than 2 years. See Paschka, P. et al., "Wilms' Tumor 1 Gene Mutations Independently Predict Poor Outcome in Patients with Cytogenetically Normal Acute Myeloid Leukemia: a cancer and leukemia group B study." J Clin Oncol. Vol. 26, No. 28, pp. 4595-4602 (1 Oct. 2008) Half of patients with RUNX1 mutations are expected to die within 10 months, with only 2% of patients surviving at 5 years. See Mendler, J. H. et al., "RUNX1 Mutations are Associated with Poor Outcome in Younger and Older Patients with Cytogenetically Normal Acute Myeloid Leukemia and with Distinct Gene and MicroRNA Expression Signatures." J Clin Oncol. Vol. 30, No. 25, pp. 3109-3118 (1 Sep. 2012). Half of patients with NUP98 fusions are expected to die within 10 months. See Michmerhuizen, N. L. et al., "Mechanistic Insights and Potential Therapeutic Approaches for NUP98-Rearranged Hematologic Malignancies." Blood. Vol. 136, No. 29, pp. 2275-2289 (12 Nov. 2020) Half of newly diagnosed patients with 5 to 6 separate driver mutations are expected to die within 2 years of diagnosis. See Papaemmanuil, E. et al., "Genomic Classification and Prognosis in Acute Myeloid Leukemia." N Engl J Med. Vol. 374, No. 23, pp. 2209-2221 (9 Jun. 2016)

At diagnosis, the patient was found to have 61% bone marrow blasts. Following diagnosis, the patient was provided with oral Crenolanib besylate on a clinical trial for newly diagnosed AML patients (NCT02283177). The patient was initially treated with induction chemotherapy, comprised of seven days of cytarabine and 3 days of daunorubicin. The patient began therapy with 100 mg of Crenolanib besylate three times daily on day 10.

A bone marrow biopsy taken on day 39 of the clinical trial revealed the patient's bone marrow blasts had reduced to <5%, classified as a complete remission. The patient's overall survival was greater than 18 months, significantly longer than the predicted overall survival for patients with NUP98 fusions.

Table 4 below illustrates the ability of Crenolanib to clear and maintain clearance of malignant leukemia in the bone marrow of Example B, a newly diagnosed patient with FLT3-ITD, WT1, ETV6, and RUNX1 mutations and a NUP98-PRRX2 fusion after treatment with chemotherapy and Crenolanib besylate.

TABLE 4

Ability of Crenolanib to clear and maintain clearance of malignant leukemia in the bone marrow.

| Days on Clinical Trial | Bone Marrow Blast (%) |
|---|---|
| 0 | 61% |
| 39 | <5% |
| 48 | <5% |
| 95 | <5% |

Example C: The effect of Crenolanib besylate therapy in a newly diagnosed AML patient with FLT3-ITD, IDH1, and NPM1 mutations: achievement of reduction in bone marrow blasts to less than 5% with hematologic recovery.

A 58-year-old female was diagnosed with AML positive for a FLT3-ITD mutation. The patient's leukemic blasts also carried mutations in the IDH1 and NPM1 genes. Specifically, the patient had an IDH1 R140Q mutation, and a NPM1 mutation at amino acid residue W288. As these mutations are characterized as independent driver mutations, and are each associated with a particularly poor prognosis, the patient's presentation of these mutations placed him in a significantly high-risk group for AML patients, associated with poor response rates, increased cumulative incidence of relapse, and shortened survival. Half of patients with FLT3-ITD and IDH1 co-occurring mutations are expected to die within 1.5 years of diagnosis. See Boddu, P. et al., "Influence of IDH on FLT3-ITD Status in Newly Diagnosed AML." Leukemia. Vol. 31, No. 11, pp. 2526-2529 (29 Jul. 2017).

While NPM1 mutations alone are a favorable prognostic factor according to ELN guidelines, when present in combination with FLT3-ITD mutations, it is a poor prognostic marker. See Dohner, H. et al., "Diagnosis and Management of AML in Adults: 2017 ELN recommendations from an international expert panel." Blood. Vol. 129, No. 4, pp. 424-447 (26 Jan. 2017)

At diagnosis, the patient was found to have 83% bone marrow blasts. . . . Following diagnosis, the patient was provided with oral Crenolanib besylate on a clinical trial for newly diagnosed AML (NCT02283177). The patient was initially treated with induction chemotherapy, comprised of seven days of cytarabine and three days of daunorubicin. The patient began therapy with 100 mg of Crenolanib besylate three times daily on day 10.

A bone marrow biopsy taken on day 21 of the clinical trial revealed the patient's bone marrow blasts had reduced to less than 5%, classified as a complete remission. Additional bone marrow biopsies taken on days 36, 76, 124, and 455 confirmed the patient remained in remission. The patient remains alive and in remission 4 years after initial treatment.

Table 5 below illustrates the ability of Crenolanib to clear and maintain clearance of malignant leukemia in the bone marrow of Example C, a newly diagnosed patient with FLT3-ITD, IDH1, and NPM1 mutations after treatment with chemotherapy and Crenolanib besylate.

TABLE 5

Ability of Crenolanib to clear and maintain clearance of malignant leukemia in the bone marrow.

| Days on Clinical Trial | Bone Marrow Blast (%) |
|---|---|
| 0 | 83% |
| 36 | <5% |
| 76 | <5% |
| 124 | <5% |
| 455 | <5% |

Example D: The effect of Crenolanib besylate therapy in a newly diagnosed AML patient with FLT3-TKD, NPM1 and JAK2 mutations: achievement of reduction in bone marrow blasts to less than 5% with hematologic recovery.

A 61-year-old male was diagnosed with AML positive for a FLT3-TKD mutation. The patient's leukemic blasts also carried mutations in the NPM1 and JAK2 genes. Specifically, the patient had a NPM1 frameshift mutation at amino acid residue W288 and a JAK2 W1113C mutation. As these mutations are characterized as independent driver mutations, and are each associated with a particularly poor prognosis, the patient's presentation of these mutations placed him in a significantly high-risk group for AML patients, associated with poor response rates, increased cumulative incidence of relapse, and shortened survival. While NPM1 mutations alone are a favorable prognostic factor according to ELN guidelines, when present in combination with FLT3-ITD mutations, it is a poor prognostic marker. See Dohner, H. et al., "Diagnosis and Management of AML in Adults: 2017 ELN recommendations from an international expert panel." Blood. Vol. 129, No. 4, pp. 424-447 (26 Jan. 2017)

At diagnosis, the patient was found to have 41% bone marrow blasts. Following diagnosis, the patient was provided with oral Crenolanib besylate on a clinical trial for newly diagnosed AML (NCT02283177). The patient was initially treated with induction chemotherapy, comprised of seven days of cytarabine and three days of daunorubicin.

The patient began therapy with 100 mg of Crenolanib besylate three times daily on day 10.

A bone marrow biopsy taken on day 34 of the clinical trial revealed the patient's bone marrow blasts had reduced to less than 5%, classified as a complete remission. Additional bone marrow biopsies taken on days 114, 163, and 226 confirmed the patient remained in remission. The patient received a hematopoietic stem cell transplant. The patient remains alive and in remission 4 years after initial diagnosis, significantly longer than the expected median overall survival for patients with activating FLT3 mutations.

Table 6 below illustrates the ability of Crenolanib to clear and maintain clearance of malignant leukemia in the bone marrow of Example D a newly diagnosed patient with FLT3-TKD, NPM1, and JAK2 mutations after treatment with chemotherapy and Crenolanib besylate.

TABLE 6

Ability of Crenolanib to clear and maintain clearance of malignant leukemia in the bone marrow.

| Days on Clinical Trial | Bone Marrow Blast (%) |
| --- | --- |
| 0 | 41% |
| 34 | <5% |
| 114 | <5% |
| 163 | <5% |
| 226 | <5% |

Example E: The effect of Crenolanib besylate therapy in a newly diagnosed AML patient with FLT3-ITD, FLT3-TKD, NPM1, and WT1 mutations and complex karyotype: achievement of reduction in bone marrow blasts to less than 5% with hematologic recovery.

A 68-year-old male was diagnosed with AML positive for FLT3-ITD and TKD mutations. The patient's leukemic blasts also carried mutations in the NPM1 and WT1 genes and a complex karyotype. Specifically, the patient had a NPM1 frameshift mutation at amino acid residue 290 and a WT1 frameshift mutation at amino acid residue A314. As these mutations are characterized as independent driver mutations, and are each associated with a particularly poor prognosis, the patient's presentation of these mutations placed him in a significantly high-risk group for AML patients, associated with poor response rates, increased cumulative incidence of relapse, and shortened survival. While NPM1 mutations alone are a favorable prognostic factor according to ELN guidelines, when present in combination with FLT3-ITD mutations, it is a poor prognostic marker. See Dohner, H. et al., "Diagnosis and Management of AML in Adults: 2017 ELN recommendations from an international expert panel." Blood. Vol. 129, No. 4, pp. 424-447 (26 Jan. 2017) Half of patients with WT1 mutations are expected to die within 1 year of diagnosis, with less than 15% of patients expected to survive more than 2 years. See Paschka, P. et al., "Wilms' Tumor 1 Gene Mutations Independently Predict Poor Outcome in Patients with Cytogenetically Normal Acute Myeloid Leukemia: a cancer and leukemia group B study." J Clin Oncol. Vol. 26, No. 28, pp. 4595-4602 (1 Oct. 2008) Half of patients with a complex karyotype are expected to die within 2 years of diagnosis. See Papaemmanuil, E. et al., "Genomic Classification and Prognosis in Acute Myeloid Leukemia." N Engl J Med. Vol. 374, No. 23, pp. 2209-2221 (9 Jun. 2016).

At diagnosis, the patient was found to have 39% bone marrow blasts. . . . Following diagnosis, the patient was provided with oral Crenolanib besylate on a clinical trial for newly diagnosed AML (NCT02283177). The patient was initially treated with induction chemotherapy, comprised of seven days of cytarabine and three days of daunorubicin. The patient began therapy with 100 mg of Crenolanib besylate three times daily on day 9.

A bone marrow biopsy taken on day 28 of the clinical trial revealed the patient's bone marrow blasts had reduced to less than 5%, classified as a complete remission. Additional bone marrow biopsies taken on days 74 and 194 confirmed the patient remained in remission and the patient received a hematopoietic stem cell transplant. The patient remains alive and in remission 4 years after diagnosis, significantly exceeding the expected median survival of patients with FLT3-ITD, FLT3-TKD, NPM1, and WT1 mutations and complex karyotype.

Table E below illustrates the ability of Crenolanib to clear and maintain clearance of malignant leukemia in the bone marrow of Example E, a newly diagnosed patient with FLT3-ITD, FLT3-TKD, NPM1, and WT1 mutations and complex karyotype after treatment with chemotherapy and Crenolanib besylate.

TABLE 7

Ability of Crenolanib to clear and maintain clearance of malignant leukemia in the bone marrow.

| Days on Clinical Trial | Bone Marrow Blast (%) |
| --- | --- |
| 0 | 39% |
| 28 | <5% |
| 74 | <5% |
| 194 | <5% |

Example F: The effect of Crenolanib besylate therapy in a newly diagnosed AML patient with FLT3-ITD, FLT3-TKD, CEBPA, NPM1, KRAS, and NRAS mutations: achievement of reduction in bone marrow blasts to less than 5% with hematologic recovery.

A 54-year-old female was diagnosed with AML positive for FLT3-ITD and TKD mutations. The patient's leukemic blasts also carried mutations in the CEBPA, NPM1, KRAS, and NRAS genes. Specifically, the patient had a CEBPA frameshift mutation at amino acid reside P39, a NPM1 frameshift mutation at amino acid residue W288, a KRAS G12D mutation, and a NRAS G13V mutation. As these mutations are characterized as independent driver mutations, and are each associated with a particularly poor prognosis, the patient's presentation of these mutations placed her in a significantly high-risk group for AML patients, associated with poor response rates, increased cumulative incidence of relapse, and shortened survival. While CEPBA mutations alone are a favorable prognostic indicator, when present in combination with a FLT3-ITD mutation, half of patients are expected to die within 1.5 years of diagnosis, with less than one third of patients surviving at 5 years after diagnosis. See Renneville, A. et al., "The Favorable Impact of CEBPA Mutations in Patients with Acute Myeloid Leukemia is Only Observed in the Absence of Associated Cytogenetic Abnormalities and FLT3 Internal Duplication." Blood. Vol. 113, No. 21, pp. 5090-5093 (21 May 2009). While NPM1 mutations alone are a favorable prognostic factor according to ELN guidelines, when present in combination with FLT3-ITD mutations, it is a poor prognostic marker. See Dohner, H. et al., "Diagnosis and Management of AML in Adults: 2017 ELN recommendations from an international expert panel." Blood. Vol. 129, No. 4, pp. 424-447 (26 Jan. 2017) Half of patients with KRAS or NRAS mutations are expected to die within 1 year of diagnosis. See Ball, B. J. et al., "RAS Mutations are Independently Associated with Decreased Overall Survival and Event-free Survival in Patients with AML Receiving Induction Chemotherapy." Blood. Vol. 134, No. Supp_1, pp 18 (13 Nov. 2019) Half of newly diagnosed patients with 5 to 6 separate driver mutations are expected to die within 2 years of diagnosis. See Papaemmanuil, E. et al., "Genomic Classification and Prognosis in Acute Myeloid Leukemia." N Engl J Med. Vol. 374, No. 23, pp. 2209-2221 (9 Jun. 2016).

At diagnosis, the patient was found to have 63% bone marrow blasts. Following diagnosis, the patient was provided with oral Crenolanib besylate on a clinical trial for newly diagnosed AML (NCT02283177). The patient was initially treated with induction chemotherapy, comprised of seven days of cytarabine and three days of daunorubicin. The patient began therapy with 100 mg of Crenolanib besylate three times daily on day 10.

A bone marrow biopsy taken on day 35 of the clinical trial revealed the patient's bone marrow blasts had reduced to less than 5%, classified as a complete remission. Additional bone marrow biopsies taken on days 238, 294, and 406 confirmed the patient remained in remission. This patient received four cycles of cytarabine based consolidation therapy, and one year of single agent Crenolanib maintenance. The patient remains alive and in remission 4 years after diagnosis, significantly exceeding the predicted median survival for patients with FLT3-ITD, FLT3-TKD, CEBPA, NPM1, NRAS, and KRAS mutations.

Table 8 below illustrates the ability of Crenolanib to clear and maintain clearance of malignant leukemia in the bone marrow of Example F, a newly diagnosed patient with FLT3-ITD, FLT3-TKD, CEBPA, NPM1, NRAS, and KRAS mutations after treatment with chemotherapy and Crenolanib besylate.

TABLE 8

Ability of Crenolanib to clear and maintain clearance of malignant leukemia in the bone marrow.

| Days on Clinical Trial | Bone Marrow Blast (%) |
|---|---|
| 0 | 63% |
| 35 | <5% |
| 238 | <5% |
| 294 | <5% |
| 406 | <5% |

Example G: The effect of Crenolanib besylate therapy in a newly diagnosed AML patient with FLT3-ITD, NPM1 and TET2 mutations and trisomy 4: achievement of reduction in bone marrow blasts to less than 5% with hematologic recovery.

A 70-year-old male was diagnosed with AML positive for a FLT3-ITD mutation. The patient's leukemic blasts also carried mutations in the NPM1 and TET2 genes as well as the cytogenetic abnormality trisomy 4. Specifically, the patient had a NPM1 frameshift mutation at amino acid residue W288 and a TET2 frameshift mutation at amino acid residue T606. As these mutations are characterized as independent driver mutations, and are each associated with a particularly poor prognosis, the patient's presentation of these mutations placed him in a significantly high-risk group for AML patients, associated with poor response rates, increased cumulative incidence of relapse, and shortened survival. While NPM1 mutations alone are a favorable prognostic factor according to ELN guidelines, when present in combination with FLT3-ITD mutations, it is a poor prognostic marker. See Dohner, H. et al., "Diagnosis and Management of AML in Adults: 2017 ELN recommendations from an international expert panel." Blood. Vol. 129, No. 4, pp. 424-447 (26 Jan. 2017) Half of patients with TET2 mutations are expected to die within approximately 1.5 years of diagnosis, with patients with co-occurring FLT3 mutations having an even worse median survival. See Aslanyan, M. G. et al., "Clinical and Biological Impact of TET2 Mutations and Expression in Younger Adult AML Patients Treated within the EORTC/GIMEMA AML-12 Clinical Trial." Ann Hematol. Vol. 93, No. 8, pp 1401-1412 (6 Jul. 2014) Half of patients with trisomy 4 are expected to die within 2 years of diagnosis. See Chilton, L. et al. "The Prognostic Significance of Trisomy 4 in Acute Myeloid Leukaemia is Dependent on Age and Additional Abnormalities." Leukemia. Vol. 30, No. 11, pp. 2264-2267 (3 Nov. 2016)

At diagnosis, the patient was found to have 93% bone marrow blasts. Following diagnosis, the patient was provided with oral Crenolanib besylate on a clinical trial for newly diagnosed AML (NCT02283177). The patient was initially treated with induction chemotherapy, comprised of seven days of cytarabine and three days of daunorubicin. The patient began therapy with 100 mg of Crenolanib besylate three times daily on day 9.

A bone marrow biopsy taken on day 35 of the clinical trial revealed the patient's bone marrow blasts had reduced to less than 5%, classified as a complete remission. Additional bone marrow biopsies taken on days 82 and 197 confirmed the patient remained in remission and the patient received a bone marrow transplant. The patient remains alive and in remission 4 years after diagnosis, significantly exceeding the expected median survival for patients with FLT3-ITD, NPM1, and TET2 mutations and trisomy 4.

Table 9 below illustrates the ability of Crenolanib to clear and maintain clearance of malignant leukemia in the bone marrow of Example G, a newly diagnosed patient with FLT3-ITD, NPM1, and TET2 mutations and trisomy 4 after treatment with chemotherapy and Crenolanib besylate.

TABLE 9

Ability of Crenolanib to clear and maintain clearance of malignant leukemia in the bone marrow.

| Days on Clinical Trial | Bone Marrow Blast (%) |
|---|---|
| 0 | 93% |
| 35 | <5% |
| 82 | <5% |
| 197 | <5% |

Example H: The effect of Crenolanib besylate therapy in a relapsed/refractory AML patient with FLT3-ITD, IDH1, NPM1, TET2, and ASXL1 mutations and complex karyotype: achievement of reduction in bone marrow blasts to less than 5% with hematologic recovery.

A 73-year-old male was diagnosed with relapsed AML positive for a FLT3-ITD mutation. Molecular testing performed at second relapse revealed the patient had a FLT3-ITD mutation. The patient's leukemic blasts also carried mutations in the IDH1, NPM1, TET2, and ASXL1 genes. Specifically, the patient had a IDH1 R132H mutation, a NPM1 frameshift mutation at amino acid residue W288, a TET2 frameshift mutation at amino acid residue N275, and an ASXL1 A1312V mutation. As these mutations are characterized as independent driver mutations, and are each associated with a particularly poor prognosis, the patient's presentation of these mutations placed him in a significantly high-risk group for AML patients, associated with poor response rates, increased cumulative incidence of relapse, and shortened survival. While NPM1 mutations alone are a favorable prognostic factor according to ELN guidelines, when present in combination with FLT3-ITD mutations, it is a poor prognostic marker. See Dohner, H. et al., "Diagnosis and Management of AML in Adults: 2017 ELN recommendations from an international expert panel." Blood. Vol. 129, No. 4, pp. 424-447 (26 Jan. 2017) Half of newly diagnosed patients with TET2 mutations are expected to die within approximately 1.5 years of diagnosis, with patients with co-occurring FLT3 mutations having an even worse median survival. See Aslanyan, M. G. et al., "Clinical and Biological Impact of TET2 Mutations and Expression in Younger Adult AML Patients Treated within the EORTC/GIMEMA AML-12 Clinical Trial." Ann Hematol. Vol. 93, No. 8, pp 1401-1412 (6 Jul. 2014) Less than half of newly diagnosed patients with ASXL1 mutations are expected to survive 16 months. See Pratcorona, M., et al., "Acquired Mutations in ASXL1 in Acute Myeloid Leukemia: Prevalence and Prognostic Value." Haematologica. Vol. 97, No. 3, pp. 388-392 (March 2012) Half of newly diagnosed patients with 5 to 6 separate driver mutations are expected to die within 2 years of diagnosis. See Papaemmanuil, E. et al., "Genomic Classification and Prognosis in Acute Myeloid Leukemia." N Engl J Med. Vol. 374, No. 23, pp. 2209-2221 (9 Jun. 2016). For all mutation groups, the prognosis of relapsed/refractory patients is significantly worse than for newly diagnosed patients.

Following his diagnosis, the patient was initially treated with Vyxeos, a liposomal formulation of induction chemotherapy agents and achieved remission. Approximately two years later, the patient relapsed and was treated with salvage chemotherapy comprised of clofarabine, idarubicin, and cytarabine, again achieving a complete remission. Approximately four years after second remission, the patient unfortunately once again relapsed and was provided with oral Crenolanib besylate on a clinical trial for relapsed/refractory AML patients (NCT02400281). The patient was initially treated with salvage chemotherapy, comprised of four days of cytarabine and three days of idarubicin. The patient began therapy with 100 mg of Crenolanib besylate three times daily on day 5. At study entry, the patient was found to have 95% bone marrow blasts.

A bone marrow biopsy taken on day 24 of the clinical trial revealed the patient's bone marrow blasts had reduced to less than 5%, classified as a complete remission. The patient continued to receive single agent Crenolanib as maintenance therapy for one year. Due to the patient's advanced age, no further bone marrow biopsies were performed on study as the patient showed no signs of relapse, such as circulating blasts. The patient's overall survival from study enrollment exceeded 2 years (at which point the patient was no longer followed per the study protocol), significantly exceeding the expected survival for relapsed/refractory AML patients with FLT3-ITD, NPM1, TET2, and ASXL1 mutations.

Table 10 below illustrates the ability of Crenolanib to clear malignant leukemia in the bone marrow of Example H, a relapsed/refractory patient with FLT3-ITD, NPM1, TET2, and ASXL1 mutations.

TABLE 10

Ability of Crenolanib to clear malignant leukemia in the bone marrow.

| Days on Clinical Trial | Bone Marrow Blast (%) |
| --- | --- |
| 0 | 95% |
| 24 | <5% |

Example I: The effect of Crenolanib besylate therapy in a relapsed/refractory AML patient with FLT3-ITD and NPM1 mutations: achievement of reduction in bone marrow blasts to less than 5% with hematologic recovery.

A 51-year-old female was diagnosed with relapsed AML positive for a FLT3-ITD mutation. The patient's leukemic blasts also harbored a mutation in the NPM1 gene. Specifically, the patient had a NPM1 frameshift mutation at amino acid reside W288. As these mutations are characterized as independent driver mutations, and are each associated with a particularly poor prognosis, the patient's presentation of these mutations placed her in a significantly high-risk group for AML patients, associated with poor response rates, increased cumulative incidence of relapse, and shortened survival. While NPM1 mutations alone are a favorable prognostic factor according to ELN guidelines, when present in combination with FLT3-ITD mutations, it is a poor prognostic marker. See Dohner, H. et al., "Diagnosis and Management of AML in Adults: 2017 ELN recommendations from an international expert panel." Blood. Vol. 129, No. 4, pp. 424-447 (26 Jan. 2017). For all mutation groups, the prognosis of relapsed/refractory patients is significantly worse than for newly diagnosed patients.

Following her initial diagnosis, the patient was treated with induction chemotherapy and achieved remission. Approximately 9 months later, the patient relapsed and was provided with single agent Crenolanib besylate at 100 mg three times daily on a clinical trial for relapsed/refractory AML patients (NCT01657682). At study entry, the patient was found to have 76% bone marrow blasts.

A bone marrow biopsy taken on day 27 of the clinical trial revealed the patient's bone marrow blasts had reduced to less than 5%, classified as a complete remission without platelet recovery. Additional biopsies taken on days 57 and 70 confirmed the patient remained in remission and the patient received a bone marrow transplant. The patient's overall survival exceeded one year.

Table 11 below illustrates the ability of Crenolanib to clear malignant leukemia in the bone marrow of Example I, a relapsed/refractory patient with FLT3-ITD and NPM1 mutations.

TABLE 11

Ability of Crenolanib to clear malignant leukemia in the bone marrow.

| Days on Clinical Trial | Bone Marrow Blast (%) |
| --- | --- |
| 0 | 76% |
| 27 | <5% |
| 57 | <5% |
| 70 | <5% |

Example J: The effect of Crenolanib besylate therapy in a relapsed/refractory AML patient with FLT3-TKD, NPM1, CEBPA, and WT1 mutations and t (3;16): achievement of reduction in bone marrow blasts to less than 5% with hematologic recovery.

A 37-year-old female was diagnosed with relapsed AML positive for a FLT3-TKD mutation. The patient's leukemic blasts also harbored mutations in the NPM1, CEBPA, and WT1 genes as well as t (3;16) (a translocation between chromosomes 3 and 16). Specifically, the patient had a NPM1 frameshift mutation at amino acid residue W288, a CEBPA frameshift mutation at amino acid residue H56, and a WT1 M250K mutation. As these mutations are characterized as independent driver mutations, and are each associated with a particularly poor prognosis, the patient's presentation of these mutations placed her in a significantly high-risk group for AML patients, associated with poor response rates, increased cumulative incidence of relapse, and shortened survival. While NPM1 mutations alone are a favorable prognostic factor according to ELN guidelines, when present in combination with FLT3 mutations, it is a poor prognostic marker. See Dohner, H. et al., "Diagnosis and Management of AML in Adults: 2017 ELN recommendations from an international expert panel." Blood. Vol. 129, No. 4, pp. 424-447 (26 Jan. 2017). While CEPBA mutations alone are a favorable prognostic indicator, when present in combination with a FLT3 mutation, half of newly diagnosed patients are expected to die within 1.5 years of diagnosis, with less than one third of patients surviving at 5 years after diagnosis. See Renneville, A. et al., "The Favorable Impact of CEBPA Mutations in Patients with Acute Myeloid Leukemia is Only Observed in the Absence of Associated Cytogenetic Abnormalities and FLT3 Internal Duplication." Blood. Vol. 113, No. 21, pp. 5090-5093 (21 May 2009). Half of newly diagnosed patients with WT1 mutations are expected to die within 1 year of diagnosis, with less than 15% of patients expected to survive more than 2 years. See Paschka, P. et al., "Wilms' Tumor 1 Gene Mutations Independently Predict Poor Outcome in Patients with Cytogenetically Normal Acute Myeloid Leukemia: a cancer and leukemia group B study." J Clin Oncol. Vol. 26, No. 28, pp. 4595-4602 (1 Oct. 2008) Half of newly diagnosed patients with FLT3 mutations and abnormal karyotype are expected to die within 10 months of diagnosis. See Tao, S., et al., "Prognosis and Outcome of Patients with Acute Myeloid Leukemia Based on FLT3-ITD Mutations with or without Additional Abnormal Cytogenetics." Oncology Letters. Vol. 18, No. 6, pp. 6766-6774 (5 Nov. 2019).

Following her initial diagnosis, the patient was treated with induction chemotherapy comprised of cytarabine and idarubicin and achieved remission. The patient then received a hematopoietic stem cell transplant. Approximately 6 months after transplant, the patient relapsed and was treated with a salvage chemotherapy regiment comprised of mitoxantrone, etoposide, and cytarabine and achieved second remission. Within 10 months of second remission, the patient once again relapsed and was provided with single agent Crenolanib besylate at 100 mg three times daily on a clinical trial for relapsed/refractory AML patients (NCT01657682). At study entry, the patient was found to have 90% bone marrow blasts.

A bone marrow biopsy taken on day 24 of the clinical trial revealed the patient's bone marrow blasts had reduced to 22%, classified as a partial remission. As treatment options for a multiply relapsed patient, especially those who have relapsed post-transplant, are limited, the patient continued on single agent Crenolanib besylate therapy. A bone marrow biopsy taken on day 52 of the clinical trial revealed the patient's bone marrow blasts had reduced to less than 5%, classified as a complete remission. The patient's overall survival exceeded 7.5 months.

Table 12 below illustrates the ability of Crenolanib to clear malignant leukemia in the bone marrow of Example J, a relapsed/refractory patient with FLT3-TKD, NPM1, CEBPA, and WT1 mutations and t (3;16).

TABLE 12

Ability of Crenolanib to clear malignant leukemia in the bone marrow.

| Days on Clinical Trial | Bone Marrow Blast (%) |
|---|---|
| 0 | 90% |
| 24 | 22% |
| 52 | <5% |

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claims, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

For each of the claims, each dependent claim can depend both from the independent claim and from each of the prior dependent claims for each and every claim so long as the prior claim provides a proper antecedent basis for a claim term or element.

REFERENCES

DREXLER, et al. "Expression of FLT3 receptor and response to FLT3 ligand by leukemic cells" Leukemia. Apr. 10, 1996; 10:588-599 (ABSTRACT ONLY).
GILLILAND, et al. "The roles of FLT3 in hematopoiesis and leukemia." Blood. Sep. 1, 2002; 100:1532-1542.
STIREWALT, et al. "The role of FLT3 in haematopoietic malignancies" Nature Reviews Cancer. 2003; 3:650-665.
NAKAO, et al. ABSTRACT ONLY: "Internal tandem duplication of the FLT3 gene found in acute myeloid leukemia." Leukemia. 1996; 10:1911-1918.
KIYOI, et al. "Internal tandem duplication of the FLT3 gene is a novel modality of elongation mutation which causes constitutive activation of the product" Leukemia. 1998; 12:1333-1337.
KOTTARIDIS, et al. "The presence of a FLT3 internal tandem duplication in patients with acute myeloid leukemia (AML) adds important prognostic information to cytogenetic risk group and response to the first cycle of chemotherapy: analysis of 854 patients from the United Kingdom Medical Research Counsel AML 10 and 12 trials" Blood. Sep. 15, 2001; 98:1742-1759.
YAMAMOTO, et al. "Activating mutation of D835 within the activation loop of FLT3 in human hematologic malignancies" Blood. 2001; 97"2434-2439.
THIEDE, et al. "Analysis of FLT3-activating mutations in 979 patients with acute myelogenous leukemia: association with FAB subtypes and identification of subgroups with poor prognosis" Blood. 2002; 99:4326-4335.
BAINS, et al. "FLT3 and NPM1 mutations in myelodysplastic syndromes: Frequency and potential value for predicting progression to acute myeloid leukemia" American Journal of Clinical Pathology. January 2011; 135:62-69.
BHAMIDPATI, et al. "FLT3 mutations in myelodysplastic syndromes (MDS) and chronic myelomonocytic leukemia (CMML). 2012. Journal of Clinical Oncology. Suppl; abstract 6597.
KIYOI, et al. "Internal tandem duplication of FLT3 associated with leukocytosis in acute promyelocytic leukemia" Leukemia Study Group of the Ministry of Health and Welfare (Kohseisho). Leukemia. 1997; 11:1447-1452.
SCHNITTGER, et al. "Analysis of FLT3 length mutations in 1003 patients with acute myeloid leukemia: correlation to cytogenetics, FAB subtype, and prognosis in the AMLCG study and usefulness as a marker for the detection of minimal residual disease" Blood. 2002; 100:59-66.
ABU-DUHIER, et al. "FLT3 internal tandem duplication mutations in adult acute myeloid leukemia define a high-risk group" British Journal of Hematology. Jun. 7, 2000; 111:190-195.
KIYOI et al. "Prognostic implication of FLT3 and N-RAS gene mutations in acute myeloid leukemia" Blood. May 1, 1999; 93:3074-3080.
BACHER, et al. "Prognostic relevance of FLT3-TKD mutations in AML: the combination matters—an analysis of 3082 patients" Blood. Mar. 1, 2008; 111:2527-2537.
KINDLER, et al. "FLT3 as a therapeutic target in AML: still challenging after all these years" Blood. Dec. 9, 2010; 116:5089-102.
LEVIS, et al. "A FLT3 tyrosine kinase inhibitor is selectively cytotoxic to acute myeloid leukemia blasts harboring FLT3 internal tandem duplication mutations" Blood. Aug. 1, 2001; 98 (3): 885-887.
TSE, et al. "Inhibition of FLT3-mediated transformation by use of a tyrosine kinase inhibitor" Leukemia. July 2001; 15 (7): 1001-1010.
SMITH, et al. Single agent CEP-701, a novel FLT3 inhibitor, shows biologic and clinical activity in patients with relapsed or refractory acute myeloid leukemia Blood, May 2004; 103:3669-3676.
GRISWOLD, et al. "Effects of MLN518, a dual FLT3 and KIT inhibitor, on normal and malignant hematopoiesis" Blood. November 2004; 104 (9): 2912-2918.
YEE, et al., SU5416 and SU5614 inhibit kinase activity of wild-type and mutant FLT3 receptor tyrosine kinase. Blood, October 2002; 100 (8): 2941-2949.
O'Farrell et al., SU11248 is a novel FLT3 tyrosine kinase inhibitor with potent activity in vitro and in vivo. Blood, May 2003; 101 (9): 3597-3605.
STONE, R. M et al., PKC-412 FLT3 inhibitor therapy in AML: results of a phase II trials. Ann. Hematol. 2004; 83 Suppl 1: S89-90.
MURATA, K. et al., Selective cytotoxic mechanism of GTP-14564, a novel tyrosine kinase inhibitor in leukemia cells expressing a constitutively active Fms-like tyrosine kinase 3 (FLT3). J Biol Chem. Aug. 29, 2003; 278 (35): 32892-32898 [Epub 2003 Jun. 18].

LEVIS, et al. "Small Moleucle FLT3 Tyrosine Kinase Inhibitors" Current Pharmaceutical Design. 2004, 10, 1183-1193.

CHESON, et al. "Revised Recommendations of the International Working Group for Diagnosis, Standardization of Response Criteria, Treatment Outcomes, and Reporting Standards for Therapeutic Trials in Acute Myeloid Leukemia" J Clin Oncol. Dec. 15, 2003; 21:4642-4649.

BORTHAKUR, et al. "Phase I study of sorafenib in patients with refractory or relapsed acute leukemias." Haematologica. January 2011; 96:62-8. Epub Oct. 15, 2010

SMALL D. FLT3 mutations: biology and treatment. Hematology Am Soc Hematol Educ Program. 2006:178-84.

AMIN, et al. "Having a higher blast percentage in circulation than bone marrow; clinical implications in myelodysplastic syndrome and acute lymphoid and myeloid leukemias" Leukemia. Jul. 28, 2005:19: 1567-72.

VANDERWALDE, A., "Genetics of Acute Myeloid Leukemia," available at http://emedicine.medscape.com/article/1936033-overview (last updated 1 Apr. 2016).

DÖHNER, H., et al. "Diagnosis and management of AML in adults: 2017 ELN recommendations from an international expert panel," Blood. Vol. 129, No. 3, pp. 424-447 (28 Nov. 2016).

PAPAEMMANUIL, E., "Genomic Classification and Prognosis in Acute Myeloid Leukemia," New England J. Med. Vol. 374, No. 23, pp. 2209-2221 (9 Jun. 2016).

LEWIS, et al. "Phase I study of the safety, tolerability, and pharmacokinetics of oral CP-868-596, a highly specific platelet-derived growth factor receptor tyrosine kinase inhibitor in patients with advanced cancers" J Clin Oncol. Nov. 1, 2009; 27 (31), 5262-5269.

CORTES, et al. "AC220, a potent, selective, second generation FLT3 receptor tyrosine kinase (RTK) inhibitor, in a first-in-human (FIH) phase I AML study" Blood (ASH Annual Meeting Abstracts) 2009 November.

CORTES, et al. "A phase II open-label, AC220 monotherapy efficacy study in patients with refractory/relapsed FLT3-ITD positive acute myeloid leukemia: updated interim results" Blood (ASH Annual Meeting Abstracts) 2011 December.

PATEL, J. P., et al. "Prognostic Relevance of Integrated Genetic Profiling in Acute Myeloid Leukemia," New England J. Med. Vol 366, No. 12, pp. 1079-189 (22 Mar. 2012).

FALINI, B., et al. "NPM1-mutated acute myeloid leukemia: from bench to bedside." Blood. 136; 15:1707-1721 (8 Oct. 2020).

SPORTOLETTI, P. et al., "Mouse Models of NPM1-mutated Acute Myeloid Leukemia: Biological and Clinical Implications." Leukemia. Vol 29, No. 2, pp 269-278 (February 2015).

BISIO, V. et al., "NUP98-fusion Transcripts Characterize Different Biological Entities Within Acute Myeloid Leukemia." Leukemia. Vol 31, No. 4, pp 974-977 (April 2017).

MICHMERHUIZEN, N. L., et al., "Mechanistic Insights and Potential Therapeutic Approaches for NUP98-Rearranged Hematologic Malignancies." Blood. Vol 136, No. 20, pp 2275-2289 (12 Nov. 2020).

THANASOPOULOU, A., et al., "Potent Co-operation between the NUP98-NSD1 Fusion and the FLT3-ITD Mutation in Acute Myeloid Leukemia Induction." Haematologica. Vol 99, No. 9, pp. 1465-1471 (22 Jun. 2014).

GREENBLATT, S., et al., "Knock-in of a FLT3-ITD Mutation Cooperates with a NUP98-HOXD13 Fusion to Generate Acute Myeloid Leukemia in a Mouse model." Blood. Vol., 119, No. 12, pp. 2883-2894 (22 Mar. 2012).

BODDU, P. et al., "Influence of IDH on FLT3-ITD Status in Newly Diagnosed AML." Leukemia. Vol. 31, No. 11, pp. 2526-2529 (29 Jul. 2017).

HOU, H. A. et al., "Splicing Factor Mutations Predict Poor Prognosis in Patients with De Novo Acute Myeloid Leukemia." Oncotarget. Vol. 7, No. 8, pp. 9084-101 (23 Feb. 2016).

PASCHKA, P. et al., "Wilms' Tumor 1 Gene Mutations Independently Predict Poor Outcome in Patients with Cytogenetically Normal Acute Myeloid Leukemia: a cancer and leukemia group B study." J Clin Oncol. Vol. 26, No. 28, pp. 4595-4602 (1 Oct. 2008).

MENDLER, J., "RUNX1 Mutations Are Associated With Poor Outcome in Younger and Older Patients With Cytogenetically Normal Acute Myeloid Leukemia and With Distinct Gene and MicroRNA Expression Signatures," J. Clin. Oncol. Vol. 30, No. 25, pp. 3109-3118 (2 Jul. 2012).

BALL, B. J. et al., "RAS Mutations are Independently Associated with Decreased Overall Survival and Event-free Survival in Patients with AML Receiving Induction Chemotherapy." Blood. Vol. 134, No. Supp_1, pp 18 (13 Nov. 2019).

ASLANYAN, M. G. et al., "Clinical and Biological Impact of TET2 Mutations and Expression in Younger Adult AML Patients Treated within the EORTC/GIMEMA AML-12 Clinical Trial." Ann Hematol. Vol. 93, No. 8, pp 1401-1412 (6 Jul. 2014).

CHILTON, L. et al. "The Prognostic Significance of Trisomy 4 in Acute Myeloid Leukaemia is Dependent on Age and Additional Abnormalities." Leukemia. Vol. 30, No. 11, pp. 2264-2267 (3 Nov. 2016).

PRATCORONA, M., et al., "Acquired Mutations in ASXL1 in Acute Myeloid Leukemia: Prevalence and Prognostic Value." Haematologica. Vol. 97, No. 3, pp. 388-392 (March 2012).

RENNEVILLE, A. et al., "The Favorable Impact of CEBPA Mutations in Patients with Acute Myeloid Leukemia is Only Observed in the Absence of Associated Cytogenetic Abnormalities and FLT3 Internal Duplication." Blood. Vol. 113, No. 21, pp. 5090-5093 (21 May 2009).

TAO, S., et al., "Prognosis and Outcome of Patients with Acute Myeloid Leukemia Based on FLT3-ITD Mutations with or without Additional Abnormal Cytogenetics." Oncology Letters. Vol. 18, No. 6, pp. 6766-6774 (5 Nov. 2019).

What is claimed is:

1. A method for treating a human leukemia patient with crenolanib, where the leukemia is characterized by one or more deregulated FLT3 receptors, or one or more constitutively active FLT3 receptors, and one or more driver mutations in a NPM1 nuclear transport protein, the method comprising:

first, obtaining a biological sample from a human patient's leukemia;

then, assaying the sample for expression of one or more deregulated FLT3 receptors, one or more constitutively active FLT3 receptors, and the presence of one or more mutations in a NPM1 nuclear transport protein;

then, determining that the patient has a poor prognosis for leukemia based on the detection of the deregulated FLT3 receptor or the constitutively active FLT3 receptor, and the presence of one or more driver mutations in the NPM1 nuclear transport protein;

then administering to the human patient a therapeutically effective amount of crenolanib or a pharmaceutically acceptable salt thereof, thereby treating the leukemia which has both the deregulated FLT3 receptor or the constitutively active FLT3 receptor and one or more driver mutations in the NPM1 nuclear transport protein.

2. The method of claim 1, wherein the FLT3 mutation is selected from at least one of FLT3-ITD or FLT3-TKD.

3. The method of claim 1, wherein the therapeutically effective amount of crenolanib or the pharmaceutically acceptable salt thereof are from about 50 to 500 mg per day, 100 to 450 mg per day, 200 to 400 mg per day, 300 to 500 mg per day, 350 to 500 mg per day, or 400 to 500 mg per day; or
the therapeutically effective amount of crenolanib or the pharmaceutically acceptable salt thereof is administered at least one of continuously, intermittently, systemically, or locally; or
the therapeutically effective amount of crenolanib or the pharmaceutically acceptable salt thereof is administered orally, intravenously, or intraperitoneally.

4. The method of claim 1, wherein the crenolanib or the pharmaceutically acceptable salt thereof is crenolanib besylate, crenolanib phosphate, crenolanib lactate, crenolanib hydrochloride, crenolanib citrate, crenolanib acetate, crenolanib toluenesulphonate, and crenolanib succinate.

5. The method of claim 1, wherein the method comprises of at least one of:
administering up to three times or more a day for as long as the human patient is in need of treatment for the leukemia; or
providing at least one of sequentially or concomitantly, with another pharmaceutical agent, to maintain remission of an existing human leukemia patient, or in a relapsed/refractory human leukemia patient; or
providing as a single agent or in combination with another pharmaceutical agent to maintain remission, or in a relapse/refractory human leukemia patient; or
providing as a single agent or in combination with another pharmaceutical agent to maintain remission, or in a relapsed/refractory human pediatric leukemia patient.

6. The method of claim 1, wherein the human patient is relapsed/refractory to another tyrosine kinase inhibitor or chemotherapy.

7. A method for treating a human leukemia patient suffering from both a mutated FLT3 or a constitutively active FLT3 mutant and one or more driver mutations in a NPM1 nuclear transport protein, the method comprising:
first, obtaining a biological sample from a human patient's leukemia;
then assaying the biological sample for expression of a mutated FLT3 receptor or a constitutively active FLT3 receptor, and the presence of one or more driver mutations in a NPM1 nuclear transport protein, and
then administering to the patient a therapeutically effective amount of crenolanib or a pharmaceutically acceptable salt thereof, thereby treating the leukemia which has both a deregulated FLT3 receptor or a constitutively active FTL3 receptor and one or more driver mutations in the NPM1 nuclear transport protein.

8. The method of claim 7, wherein the FLT3 mutation is selected from at least one of FLT3-ITD or FLT3-TKD.

9. The method of claim 7, wherein the therapeutically effective amount of crenolanib or a pharmaceutically acceptable salt thereof is administered orally, intravenously, or intraperitoneally.

10. The method of claim 7, wherein the method comprises at least one of:
providing the crenolanib or the pharmaceutically acceptable salt thereof is crenolanib besylate, crenolanib phosphate, crenolanib lactate, crenolanib hydrochloride, crenolanib citrate, crenolanib acetate, crenolanib toluenesulphonate, and crenolanib succinate; or
providing at least one of sequentially or concomitantly, with a chemotherapeutic agent to maintain remission, or in a relapsed/refractory leukemia; or
providing as a single agent or in combination with a chemotherapeutic agent for treatment of a human pediatric patient with leukemia; or
providing as a single agent in treatment of patients with the leukemia that is either refractory to, or has relapsed after, prior treatment with a chemotherapeutic agent or a tyrosine kinase inhibitor.

11. The method of claim 7, wherein the patient is refractory to at least one other tyrosine kinase inhibitor or a chemotherapy.

12. A method for treating a human patient suffering from acute myelogenous leukemia (AML) with crenolanib, where the AML is characterized by both a mutated FLT3 or a constitutively active FLT3 mutant and one or more driver mutations in a NPM1 nuclear transport protein, the method comprising:
first, obtaining a biological sample from a human patient's AML;
then, assaying the biological sample for expression of the mutated FLT3 or constitutively active FLT3 mutant, and the presence of one or more driver mutations in a NPM1 nuclear transport protein;
then administering to the patient a therapeutically effective amount of crenolanib or a pharmaceutically acceptable salt thereof, thereby treating the AML which has both the deregulated FLT3 receptor or the constitutively active FLT3 receptor and one or more driver mutations in a NPM1 nuclear transport protein.

13. The method of claim 12, wherein the FLT3 receptor mutation is selected from at least one of FLT3-ITD or FLT3-TKD.

* * * * *